United States Patent
Chang

(10) Patent No.: US 8,417,748 B2
(45) Date of Patent: Apr. 9, 2013

(54) MAXIMUM SIMPLEX VOLUME CRITERION-BASED ENDMEMBER EXTRACTION ALGORITHMS

(75) Inventor: Chein-I Chang, Ellicott City, MD (US)

(73) Assignee: University of Maryland at Baltimore County, Baltimore, MD (US)

( * ) Notice: Subject to any disclaimer, the term of this patent is extended or adjusted under 35 U.S.C. 154(b) by 1183 days.

(21) Appl. No.: 12/286,443

(22) Filed: Sep. 29, 2008

(65) Prior Publication Data
US 2009/0144350 A1    Jun. 4, 2009

Related U.S. Application Data

(60) Provisional application No. 60/995,963, filed on Sep. 28, 2007.

(51) Int. Cl.
*G06F 7/00* (2006.01)

(52) U.S. Cl. .............................................. 708/207

(58) Field of Classification Search .................. 708/207
See application file for complete search history.

(56) References Cited

U.S. PATENT DOCUMENTS

| | | | |
|---|---|---|---|
| 7,505,608 B2 * | 3/2009 | Portigal et al. | 382/103 |
| 7,567,712 B2 * | 7/2009 | Berman et al. | 382/191 |
| 7,680,337 B2 * | 3/2010 | Gruninger et al. | 382/191 |
| 7,756,342 B2 * | 7/2010 | Bachmann et al. | 382/224 |

* cited by examiner

*Primary Examiner* — Tan V. Mai
(74) *Attorney, Agent, or Firm* — Benjamin Aaron Adler

(57) ABSTRACT

Provided herein are algorithms and processes to extract endmembers from hyperspectral image data in real time. A Simplex Growing Algorithm is effective to estimate a p number of endmembers to be generated, to select one or more initial endmembers as a simplex of k members and to add a k+1 endmember to the simplex that yields a maximum simplex volume until k=p, thereby extracting one or more endmembers from the data. Alternatively, N-FINDR algorithms form an initial simplex set of p endmembers obtained from the hyperspectral image data, find a maximum volume of one or more initial p endmembers therewithin, replace one or more of the p endmembers within the simplex with one or more of the found p endmembers of maximum volume, and refind a maximum volume of p endmember(s) and replace p endmember(s) until no increase in p endmember(s) volume is found.

36 Claims, 25 Drawing Sheets
(15 of 25 Drawing Sheet(s) Filed in Color)

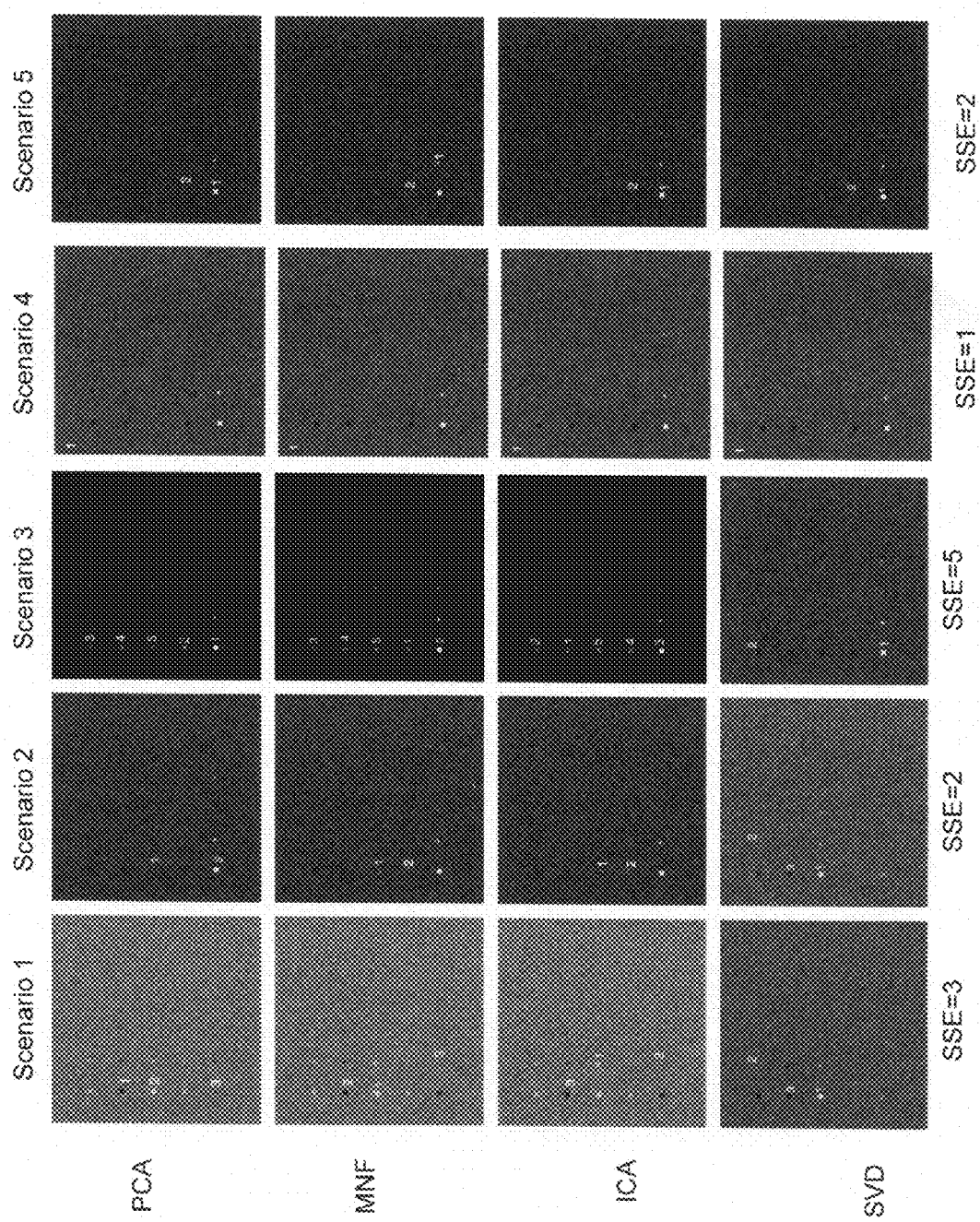

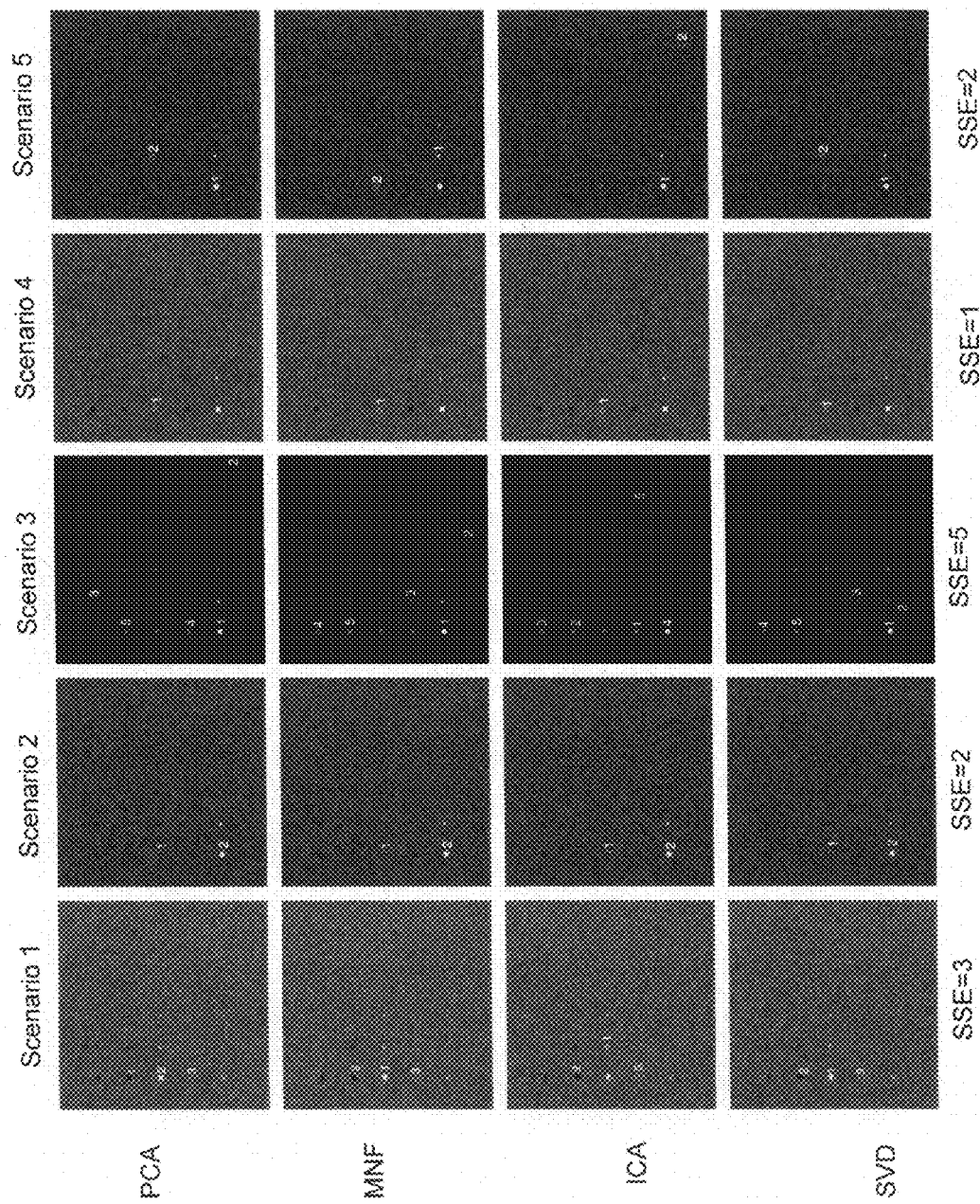

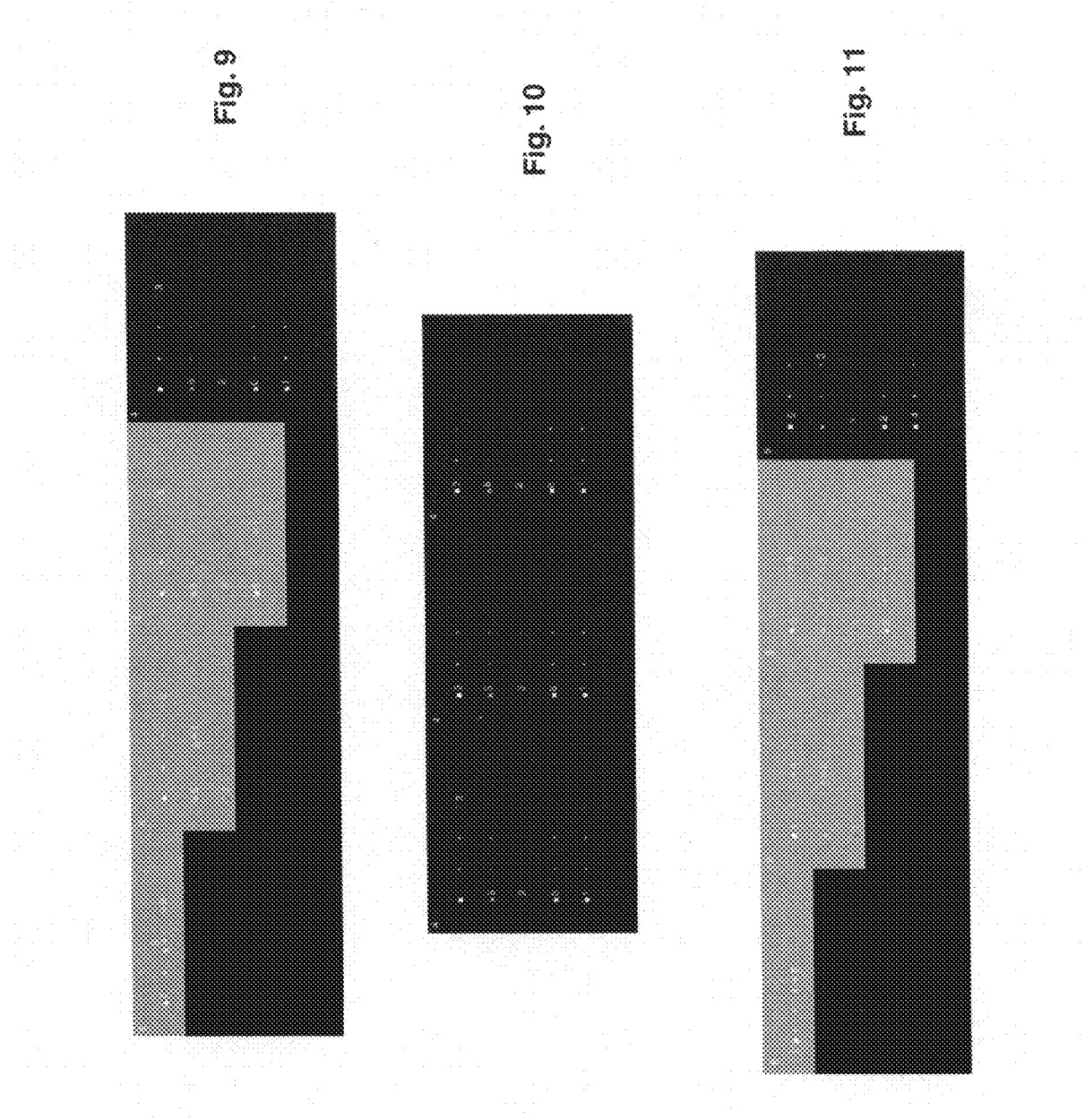

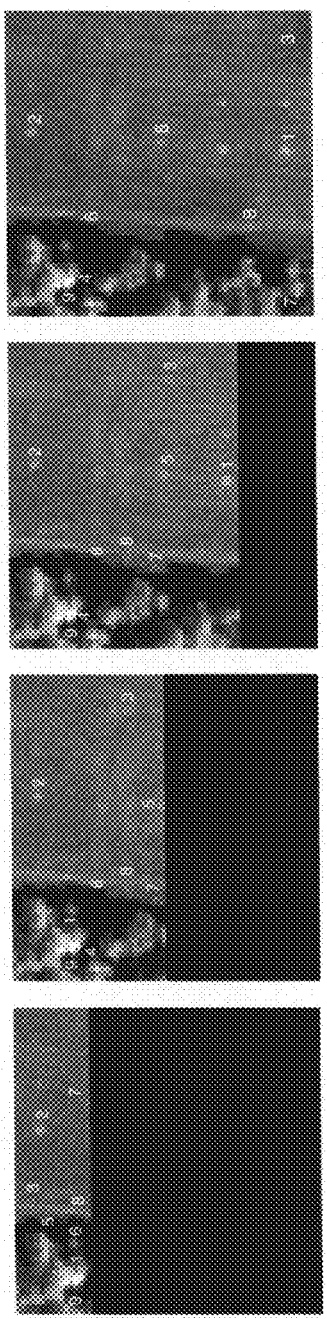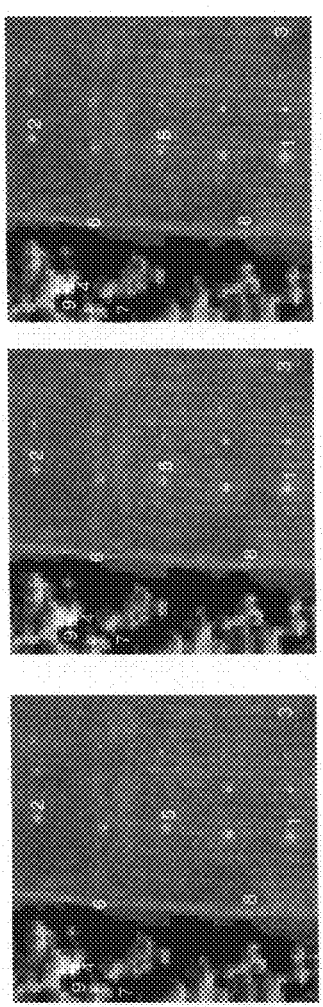

 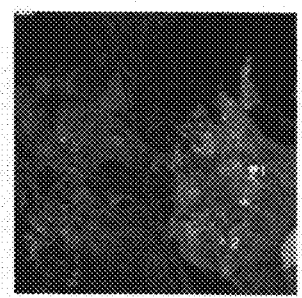 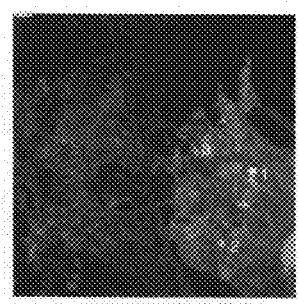
Fig. 17A     Fig. 17B     Fig. 17C
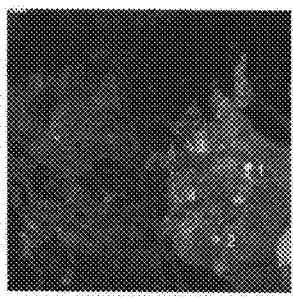 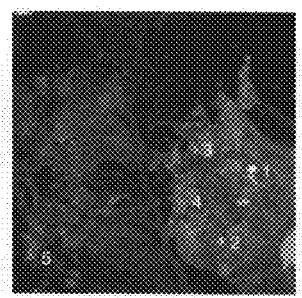 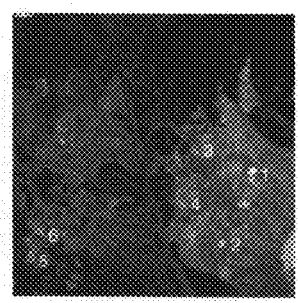
Fig. 17D     Fig. 17E     Fig. 17F
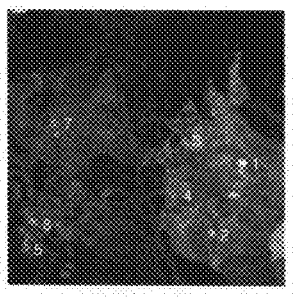 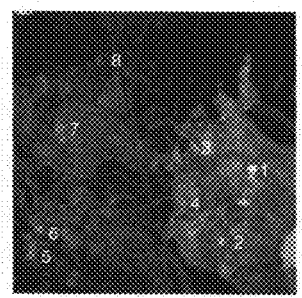 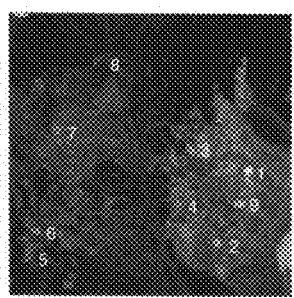
Fig. 17G     Fig. 17H     Fig. 17i
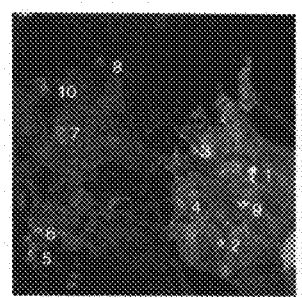 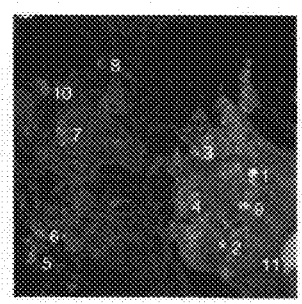 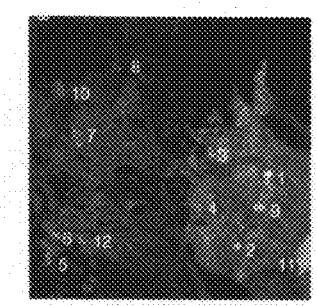
Fig. 17J     Fig. 17K     Fig. 17L

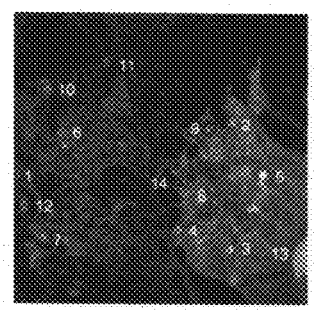
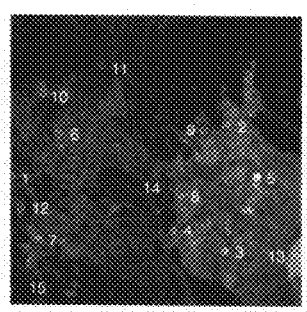
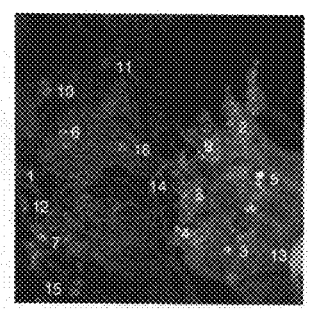
Fig. 18M　　　　Fig. 18N　　　　Fig. 18O
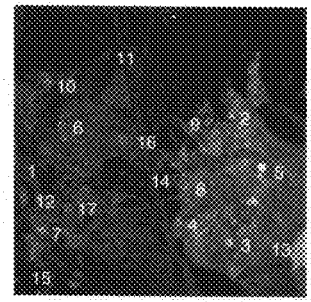
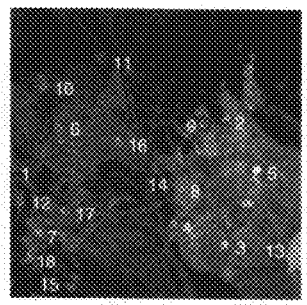
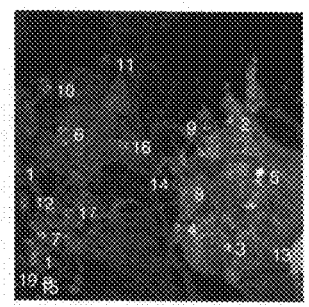
Fig. 18P　　　　Fig. 18Q　　　　Fig. 18R
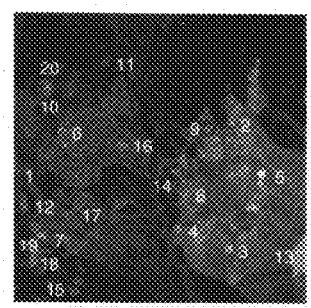
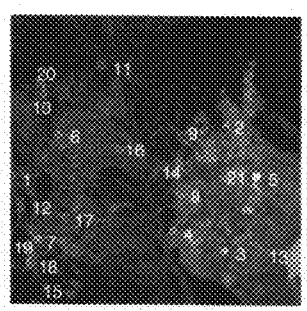
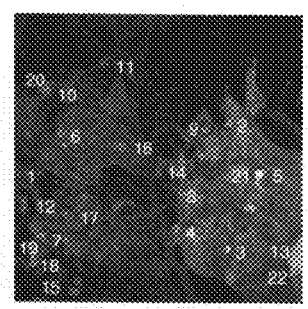
Fig. 18S　　　　Fig. 18T　　　　Fig. 18U
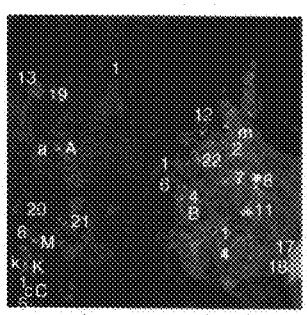
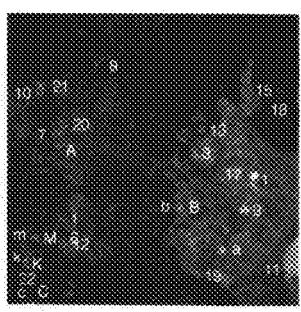
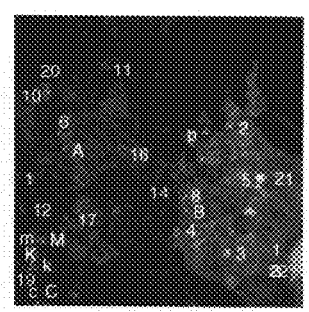
Fig. 19A　　　　Fig. 19B　　　　Fig. 19C

MAXIMUM SIMPLEX VOLUME CRITERION-BASED ENDMEMBER EXTRACTION ALGORITHMS

CROSS-REFERENCE TO RELATED APPLICATION

This non-provisional application claims benefit of provisional U.S. Ser. No. 60/995,963, filed Sep. 28, 2007, now abandoned.

BACKGROUND OF THE INVENTION

1. Field of the Invention

The present invention relates generally to the field of hyperspectral remote sensing applications. More specifically, the present invention relates to real time implementable endmember extraction algorithms.

2. Description of the Related Art

The two major classes of criteria to design endmember extraction algorithms are maximum/minimum simplex volume, such as N-FINDR [1], and maximum/minimum orthogonal projection, such as pixel purity index (PPI) [2]. Pixel Purity Index (PPI) and N-finder algorithm (N-FINDR) have been widely used in hyperspectal imaging, but only PPI is available in the most commonly used remote sensing software, called ENvironment for Visualizing Images (ENVI) commercialized by the Analytical Imaging and Geophysics (AIG) (Research Systems Inc., 2001). The reason for this is that the N-FINDR suffers from five serious drawbacks: 1) computational complexity; 2) inconsistent final results due to its use of random initial conditions; 3) requirement of prior knowledge about the number of endmembers for the N-FINDR to generate; 4) use of dimensionality reduction as a pre-processing and 5) lack of ability in real-time processing.

Although N-FINDR has become one of standard techniques in endmember extraction, its computational complexity makes it extremely expensive to use because it must conduct an exhaustive search for endmembers simultaneously. If there are N data samples and it is required to find p endmembers from these N samples, one would need to exhaust $$\binom{N}{p} = \frac{N!}{p!(N-p)!} \quad p\text{-combinations.}$$

In addition, in using random initial conditions, the N-FINDR produces different results if a different set of random initial conditions is used. Furthermore, using N-FINDR also requires knowing the number of endmembers to be generated. Most importantly, it nearly impossible to implement N-FONDR in real-time due to above-mentioned drawbacks, computational complexity, use of random initial conditions and necessity of performing dimensionality reduction as a pre-processing step.

There is a recognized need in the art in real world applications for improved methods for endmember extraction from hyperspectral images that mitigate the problems in N-FINDR. Specifically, the prior art is deficient in the lack of improved sequential, real time implementable versions of N-FINDR algorithms based on the maximum simplex volume criterion. The present invention fulfills this long-standing need and desire in the art.

SUMMARY OF THE INVENTION

The present invention is directed to a process for extracting one or more endmembers from hyperspectral image data in real time. The process comprises estimating a p number of endmembers to be generated and selecting one or more initial endmembers to form an initial simplex with k vertices specified by the selected initial endmembers. A k+1 endmember is added to the simplex that yields a maximum simplex volume until k=p thus extracting one or more endmembers from the data.

The present invention also is directed to a process for extracting one or more endmembers from hyperspectral image data in real time. The process comprises forming an initial simplex set of p endmembers obtained from the hyperspectral image data and finding a maximum simplex volume formed by one or more initial p endmembers therewithin. One or more of the p endmembers within the simplex are then replaced with one or more of the found p endmembers of maximum volume. A maximum volume of p endmember(s) is refound and p endmember(s) are replaced until no increase in p endmember(s) volume is found, thus extracting the endmember(s) from the data. The present invention is directed to a related process further comprising the steps of estimating a p number of endmembers to generate from the data and applying means for reducing data dimensionality top.

The present invention is directed further to a process for extracting one or more endmembers from hyperspectral image data in real time. The process comprises implementing an outer loop process which comprises finding the maximum simplex volume of an initial simplex formed by p endmembers and implementing an inner loop process which comprises replacing the p endmember in the initial set absent from the found maximum simplex volume with the found p endmember to form a new initial simplex for outer loop processing until no increase in simplex volume is found, thus extracting the endmember(s). The present invention is directed to a related process further comprising the steps of estimating a p number of endmembers to generate from the data and applying means for reducing data dimensionality to p.

The present invention is directed further still to a computer program product having a memory that tangibly stores processor-executable instructions for applying an algorithm for extracting endmember(s) from hyperspectral data. The algorithm enables instructions to perform the endmember extraction processes described herein. The present invention also is directed to a computer-readable medium tangibly storing the computer program products described herein.

Other and further aspects, features, benefits, and advantages of the present invention will be apparent from the following description of the presently preferred embodiments of the invention given for the purpose of disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the matter in which the above-recited features, advantages and objects of the invention, as well as others which will become clear, are attained and can be understood in detail, more particular descriptions of the invention are briefly summarized. The above may be better understood by reference to certain embodiments thereof which are illustrated in the appended drawings. These drawings form a part of the specification. It is to be noted; however, that the appended drawings illustrate preferred embodiments of the invention and therefore are not to be considered limiting in their scope.

FIGS. 8A-8D show panel pixels extracted as endmembers by VCA (FIGS. 8A-8B) and by SGA (FIGS. 8C-8D) where values of p are estimated by SSE (FIG. 8A, 8C) and by VD (FIG. 8B, 8D).

FIG. 9 depicts the progressive results of the Causal SQ N-FINDR at four different stages FIG. 10 depicts the three outer loops executed by the Causal IN N-FINDR FIG. 11 depicts the progressive results of the Causal Circular N-FINDR at four different stages

FIGS. 13A-13G depict the progress of the first iteration of the real time SQ N-FINDR (FIGS. 13A-13D) and (e) (f) the results of the following iterations (FIGS. 13E-13G).

FIGS. 19A-19C depict the final results of the real time SQ N-FINDR (FIG. 19A), SC N-FINDR (FIG. 19B), and SGA (FIG. 19C) with the nearest pixels marked.

DETAILED DESCRIPTION OF THE INVENTION

Figure 1:
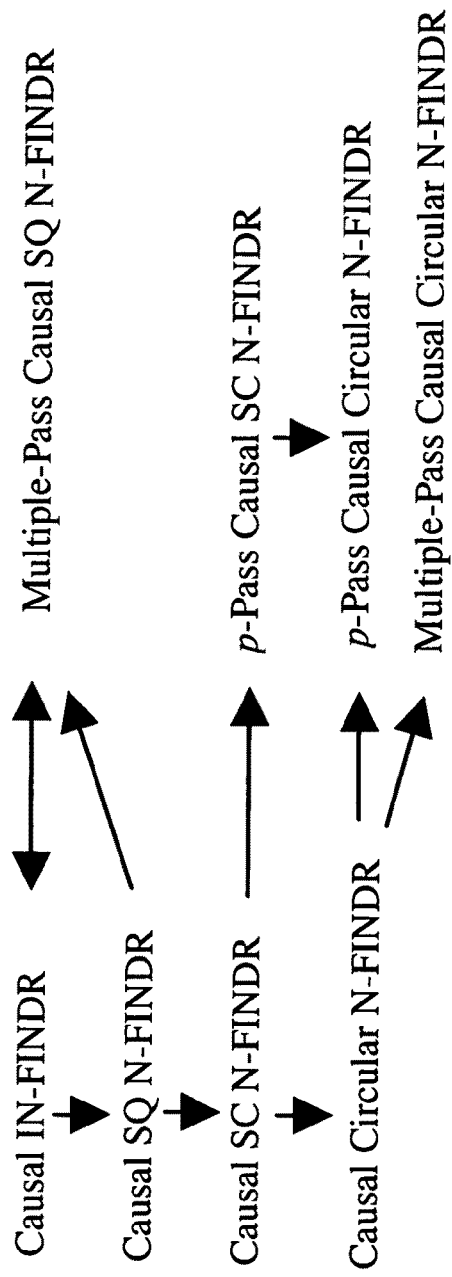
FIG. 1 is a diagram of relationships among all variants of N-FINDR.

As used herein, the term, "a" or "an" may mean one or more. As used herein in the claim(s), when used in conjunction with the word "comprising", the words "a" or "an" may mean one or more than one. As used herein "another" or "other" may mean at least a second or more of the same or different claim element or components thereof.

As used herein, the term "endmember" refers to a pure signature for a spectral class.

In one embodiment of the present invention there is provided a process for extracting one or more endmembers from hyperspectral image data in real time, comprising estimating a p number of endmembers to be generated; selecting one or more initial endmembers to form a simplex of k vertices; adding a k+1 endmember to the simplex that yields a maximum simplex volume until k=p, thereby extracting one or more endmembers from the data.

In both embodiments the values of p are estimated via virtual dimensionality. In one aspect of both embodiments selecting one or more endmembers may be causal and implementable in real time. In another aspect adding one or more endmembers at a time may be causal and implementable in real time. In yet another aspect of both embodiments selecting one or more initial endmembers comprises randomly selecting a data sample vector as an initial endmember and setting k=0. In yet another aspect selecting one or more initial endmembers comprises randomly selecting a pair of two data sample vectors to form a random degenerate 2-dimensional simplex.

In another embodiment of the present invention there is provided another process for extracting one or more endmembers from hyperspectral image data in real time, comprising forming an initial simplex set of p endmembers obtained from the hyperspectral image data; finding a maximum simplex volume formed by one or more initial p endmembers therewithin; replacing one or more of the p endmembers within the simplex with one or more of the found p endmembers of maximum volume; and refinding a maximum volume of p endmember(s) and replacing p endmember(s) until no increase in p endmember(s) volume is found, thereby extracting the endmember(s).

Further to this embodiment the process comprises estimating a p number of endmembers to generate from the data; and applying means for reducing data dimensionality to p. In this further embodiment the values of p may be estimated via virtual dimensionality.

In one aspect of both embodiments the process steps are implemented as outer and inner iterative loops, where the outer loop comprises finding the maximum simplex volume of the initial p endmembers; and the inner loop comprises replacing the p endmember in the initial set absent from the found maximum simplex volume with the found p endmember to form a new initial simplex for outer loop processing. In another aspect of both embodiments replacing one or more endmembers at a time may be causal and implementable in real time.

In one related aspect one p endmember may be replaced during each iteration of the process. In another related aspect two or more p endmembers may be replaced simultaneously during each iteration of the process. In yet another related aspect two p endmembers may be replaced successively during each iteration of the process. In yet another related aspect the found p endmembers may replace the initial set of p endmembers during each iteration of the process. In yet another related aspect the found p endmember(s) of maximum volume may replace the initial p endmembers of smallest volume.

In a related embodiment the present invention provides a process for extracting one or more endmembers from hyperspectral image data in real time, comprising implementing an outer loop process which comprises finding the maximum simplex volume of an initial simplex formed by p endmembers; and implementing an inner loop process which comprises replacing the p endmember in the initial set absent from the found maximum simplex volume with the found p endmember to form a new initial simplex for outer loop processing until no increase in simplex volume is found, thereby extracting the endmember(s).

Further to this embodiment the process may comprise estimating a p number of endmembers to generate from the data; and applying means for reducing data dimensionality to p. In this further embodiment values of p may be estimated via virtual dimensionality. In both embodiments replacing one or more endmembers at a time may be causal and implementable in real time.

In yet another embodiment of the present invention there is provided a computer program product having a memory that tangibly stores processor-executable instructions for applying an algorithm for extracting endmember(s) from hyperspectral data, where the algorithm enables instructions to estimate a p number of endmembers to be generated; select one or more initial endmembers to form a simplex of k vertices; add a k+1 endmember to the simplex that yields a maximum simplex volume until k=p, thereby extracting one or more endmembers from the data.

In this embodiment the algorithm may enable instructions to estimate p via virtual dimensionality. In one aspect of this embodiment the algorithm may enable instructions to randomly select a data sample vector as an initial endmember and to set k=0. In another aspect the algorithm may enable instructions to randomly select a pair of two data sample vectors to form a random degenerate 2-dimensional simplex. In all aspects the algorithm may enable instructions that are causal and implementable in real time.

In yet another embodiment of the present invention there is provided a computer program product having a memory that tangibly stores processor-executable instructions for applying an algorithm for extracting endmember(s) from hyperspectral data, where the algorithm enables instructions to form an initial simplex set of p endmembers obtained from the hyperspectral image data; find a maximum volume formed by one or more initial p endmembers therewithin; replace one or more of the p endmembers within the simplex with one or more of the found p endmembers of maximum volume; and refind a maximum volume of p endmember(s) and replacing p endmember(s) until no increase in p endmember(s) volume is found. Further to this embodiment the algorithm enables instructions to assign a p number of endmembers to generate from the data; and to apply means for reducing data dimensionality to p.

In both embodiments the algorithm may enable instructions to implement outer and inner iterative loop processes, where the outer loop process finds the maximum simplex volume of the initial p endmembers; and the inner loop process replaces the p endmember in the initial set absent from the found maximum simplex volume with the found p endmember to form a new initial simplex for the outer loop. Also, in both embodiments the algorithm may enable instructions that are causal and implementable in real time.

In one aspect of both embodiments the algorithm may enable instructions to replace one p endmember during each iteration of the process. In another aspect the algorithm may enable instructions to simultaneously replace two or more p endmembers during each iteration of the process. In another aspect the algorithm may enable instructions to successively replace two p endmembers during each iteration of the process. In yet another aspect the algorithm may enable instructions to replace the initial set of p endmembers with the found p endmembers during each iteration of the process. In yet another aspect the algorithm may enable instructions to replace the initial p endmembers of smallest volume with the found p endmember(s) of maximum volume.

In related embodiments the present invention provides computer readable media tangibly storing the computer program products described supra.

Provided herein are novel maximum simplex volume criterion-based endmember extraction algorithms that can be implemented in real time. Particularly, a Simplex Growing Algorithm (SGA) and sequential implementable versions of the N-FINDR algorithm that are Iterative N-FINDR (IN-FINDR), SeQuential N-FINDR (SQ N-FINDR), and SuCcessive N-FINDR (SC N-FINDR) and the real-time or causal variants thereof (FIG. 1), i.e., Single-Replacement IN-FINDR (1-IN-FINDR), Two-Replacement IN-FINDR (2-IN-FINDR), s-Replacement IN-FINDR (s-IN-FINDR), Causal IN-FINDR, Causal SQ N-FINDR, Causal Circular N-FINDR, p-Pass Causal SC N-FINDR, Causal p-pass SGA, and (p−j)-Pass Causal SGA are provided to overcome the deficiencies in the N-FINDR algorithm. Because (SGA) also is designed based on the maximum simplex volume criterion as is N-FINDR, the SGA also can be considered a sequential variant of N-FINDR.

The SGA and the sequential implementable N-FINDR remedy the serious drawbacks of N-FINDR. First, computational complexity is alleviated by making N-FINDR a sequential algorithm. Second, by introducing endmember initialization algorithms (EIA) into its design, the inconsistent final results due to its use of random initial conditions are eliminated. Third, by using a new concept, Virtual Dimensionality (VD), provided herein, the requirement of prior knowledge about the number of endmembers for the N-FINDR to generate is eliminated. Fourth, by implementing N-FINDR as a causal processing algorithm, which only requires information generated by the past inputs, real-time processing is implemented. Most algorithms which claim to be real time processing are actually not real time, but utilize causal processing because they can be implemented in a causal manner, however, the computing processing requires a time delay before they output data. Nevertheless, depending upon various applications causal processing algorithms developed in this present invention can be realized as real-time processing if the time required for causal processing for data processing by computer is negligible, for example, months in global climate change, days in flood assessment, hours in wild fire flood damage assessment, minutes in detecting moving targets, seconds in chemical/biological agent detection, etc.

Thus, the advantages of the maximum simplex volume criterion-based endmember extraction algorithms include computational efficiency, a consistent final result, determination of the number of endmembers by virtual dimensionality and ability in real time processing. The algorithms can be implemented in a hardware device. It is contemplated that Field Programmable Gate Array (FPGA) hardware design can be implemented in devices for all the algorithms. Also, the algorithms provided herein can be developed for software and tangibly stored as a computer program product comprising processor-enabled instructions or the computer program product may be stored on a computer readable medium or in a computer memory having a processor, either effective to enable the instructions contained therein, as is known and standard in the art.

It should be noted that the structure of the algorithms provided herein can engender time-delays in their running, for example, p-pass SGA and p-pass SC N-FIMDR require running the algorithms p times. For real time implementation an increase in computer power significantly reduces potential time delays. Setting up a computer system to run the instant algorithms in real time is well within the ordinary skill of an artisan in this field.

I. N-FINDR Algorithms

A. SM N-FINDR

N-FINDR, referred to as SM-N-FINDR, developed by Winter [1] can be briefly described in the following algorithmic implementation, 1. Preprocessing:
(a) Let p be the number of endmembers required to generate.
(b) Apply a maximum noise fraction (MNF) transformation (noise-adjusted principal component (NAPC) to reduce the data dimensionality from L to p−1 where L is the total number of spectral bands.

2. Exhaustive search:
For any p data sample vectors $e_1, e_2, \ldots, e_p$ form a p-vertex simplex specified by $S(e_1, e_2, \ldots, e_p)$ and define its volume, $V(e_1, e_2, \ldots, e_p)$ by $$V(e_1, \ldots, e_p) = \frac{\left|\det\begin{bmatrix} 1 & 1 & \ldots & 1 \\ e_1 & e_2 & \ldots & e_p \end{bmatrix}\right|}{(p-1)}. \quad \text{Eq. (1)}$$

Find a set of p data sample vectors, denoted by $\{e_1^*, e_2^*, \ldots, e_p^*\}$ that yields the maximum value of (1), i.e., $$\{e_1^*, e_2^*, \ldots, e_p^*\} = \arg\max_{\{e_1, e_2, \ldots, e_p\}} V(e_1, e_2, \ldots, e_p) \quad \text{Eq. (2)}$$

3. Let $\{e_1^*, e_2^*, \ldots, e_p^*\}$ be the desired set of endmembers.

B. Iterative N-FINDR (IN-FINDR)

According to step 2 described in the above SM N-FINDR an exhaustive search must be conducted by finding an optimal set of endmembers, $\{e_1^*, e_2^*, \ldots, e_p^*\}$ which requires tremendous computing time to accomplish this process. One way to mitigate this dilemma is to break up the exhaustive search process into two processes, inner loop and outer loop to be implemented iteratively. The resulting N-FINDR is called Iterative N-FINDR (IN-FINDR) and can be described as follows.

1. Preprocessing:
a) Let p be the number of endmembers required to generate.
b) Apply a DR transform such as MNF to reduce the data dimensionality from L to p−1 where L is the total number of spectral bands.

2. Initialization:
Let $\{e_1^{(0)}, e_2^{(0)}, \ldots, e_p^{(0)}\}$ be a set of initial vectors randomly selected from the data. k=0.

3. Outer Loop:
At iteration $k \geq 0$, find the volume of the simplex specified by the p vertices $e_1^{(k)}, e_2^{(k)}, \ldots, e_p^{(k)}$, $V(e_1^{(k)}, e_2^{(k)}, \ldots, e_p^{(k)})$ defined by Eq. (1).

4. Inner Loop:
For $1 \leq j \leq$, $V(e_1^{(k)}, \ldots, e_{j-1}^{(k)}, r, e_{j+1}^{(k)}, \ldots e_p^{(k)})$ is recalculated for all data sample vectors r. If none of these p recalculated volumes, $V(r, e_2^{(k)}, \ldots, e_p^{(k)})$, $V(e_1^{(k)}, r, e_3^{(k)}, \ldots, e_p^{(k)})$, $\ldots$, $V(e_1^{(k)}, \ldots, e_{p-1}^{(k)}, r)$, is greater than $V(e_1^{(k)}, e_2^{(k)}, \ldots, e_p^{(k)})$, no endmember in $e_1^{(k)}, e_2^{(k)}, \ldots, e_p^{(k)}$ will be replaced. The algorithm is terminated. Otherwise, continue.

5. Replacement Rule:
The endmember which is absent in the largest volume among the p simplexes, $S(r, e_2^{(k)}, \ldots, e_p^{(k)})$, $S(e_1^{(k)}, r, e_3^{(k)}, \ldots, e_p^{(k)})$, $\ldots$, $S(e_1^{(k)}, e_2^{(k)}, \ldots, e_{p-1}^{(k)}, r)$, will be replaced by the sample vector r. Assume that such an endmember is denoted by $e_j^{(k+1)}$. A new set of endmembers is then produced by letting $e_j^{(k+1)} = r$ and $e_i^{(k+1)} = e_i^{(k)}$ for $i \neq j$. Let $k \leftarrow k+1$ and go to step 3.

It should be noted that the IN-FINDR developed herein is generally not as optimal as SM N-FINDR. However, it can be considered as nearly optimal. The similarity between SM N-FINDR and IN-FINDR can be illustrated by the similarity between finding multiple integral and iterated integrals where the region to be integrated is generally a multi-dimensional space compared to the regions to be calculated by iterated integrals which are usually one-dimensional space. Using this context as interpretation, the exhaustive search implemented in SM N-FINDR is similar to finding a multiple integral which integrates a multi-dimensional region in the original data space, whereas the inner and outer loops carried out in IN-FINDR iteratively is similar to finding iterated integrals over one-dimensional space. In most cases, the results obtained by iterated integrals are the same as that obtained by directly finding multiple integrals according to Fubini's Theorem (Reed and Simon, 1972).

The replacement rule described in steps 4-5 of the IN-FINDR is a general concept. For practical implementation the replacement rule can be designed to ease computation depending upon how endmembers are replaced. There are several versions that can be designed to implement the replacement rule used by IN-FINDR. Three variants of IN-FINDR are developed, single-replacement N-FINDR (1-IN-FINDR), multiple-replacement IN-FINDR and SuCcessive IN-FINDR (SC IN-FINDR).

C. Single-Replacement IN-FINDR (1-IN-FINDR)

The IN-FINDR presented herein uses a simple replacement rule which replaces one endmember at a time. The resulting IN-FINDR is referred to as Single-Replacement IN-FINDR (1-IN-FINDR) and can be further specified as follows.

1. Preprocessing:
a) Let p be the number of endmembers required to generate.
b) Apply a DR transformation to reduce the data dimensionality from L to p−1 where L is the total number of spectral bands.

2. Initialization:
Let $\{e_1^{(0)}, e_2^{(0)}, \ldots, e_p^{(0)}\}$ be a set of initial vectors randomly generated from the data. Let k=0.

3. Form a simplex $S(e_1^{(k)}, \ldots, e_j^{(k)}, \ldots, e_p^{(k)})$ with $e_1^{(k)}, \ldots, e_j^{(k)}, \ldots, e_p^{(k)}$ as the p vertices and define $V(e_1^{(k)}, e_2^{(k)}, \ldots, e_p^{(k)})$ as its volume.

4. For $1 \leq j \leq p$ find $e_j^{(k,*)}$ which yields the maximum volume of $V(e_1^{(k)}, \ldots, e_{j-1}^{(k)}, r, e_{j+1}^{(k)}, \ldots, e_p^{(k)})$ over all sample vectors r, i.e., $$e_j^{(k,*)} = \max_r V(e_1^{(k)}, \ldots, e_{j-1}^{(k)}, r, e_{j+1}^{(k)}, \ldots, e_p^{(k)}), \quad \text{Eq. (3)}$$

while fixing other endmembers $e_l^{(k)}$ with $l \neq j$.

5. Check if $$e_j^{(k)} = e_j^{(k,*)} \text{ for all } j\text{'s with } 1 \leq j \leq p. \quad \text{Eq. (4)}$$

If yes, the algorithm is terminated. Otherwise, let $e_j^{(k+1)} = e_j^{(k,*)}$. Set $k \leftarrow k+1$ and go to step 3.

D. Multiple-Replacement IN-FINDR

In the 1-IN-FINDR described above, the replacement carried out in step 5 is done by one single endmember at a time for each iteration, which is the endmember $e_j^{(k,*)}$ found in step 4. It is a suboptimal algorithm to perform endmember replacement in step 5 to save computational complexity. An extension of 1-IN-FINDR is to replace two endmembers at a time rather than single replacement implemented in 1-IN-FINDR. The following algorithm is designed for this purpose. It is a two-replacement IN-FINDR (2-IN-FINDR) where the single endmember replacement process carried out in steps 4-5 in 1-IN-FINDR is replaced by two endmembers at a time for each iteration described in the following steps 4-5.

1. Two-Replacement IN-FINDR (2-IN-FINDR)

4. For each pair (i,j) with $1 \leq i < j \leq p$ find a pair of $(e_i^{(k,*)}, e_j^{(k,*)})$ which yields the maximum volume of $V(e_1^{(k)}, \ldots, e_{i-1}^{(k)}, r, e_{j-1}^{(k)}, r', e_{j+1}^{(k)}, \ldots, e_p^{(k)})$ over all sample vectors r, i.e., $$(e_i^{(k,*)}, e_j^{(k,*)}) = \max_{(r,r')} V(e_1^{(k)}, \ldots, e_{i-1}^{(k)}, r, e_{i+1}^{(k)}, \ldots, e_{j-1}^{(k)}, r', e_{j+1}^{(k)}, \ldots, e_p^{(k)}), \quad \text{Eq. (5)}$$

while fixing other endmembers $e_l^{(k)}$ with $l \neq i, j$. It generally requires an extensive search for an optimal pair $(e_i^{(k,*)}, e_j^{(k,*)})$ to satisfy (5), which is very time-consuming. One way to alleviate such a searching process is to solve two endmembers successively as follows.

$$(e_i^{(k,*)}, e_j^{(k,*)}) = \max_r \{\max_{r'} [V(e_1^{(k)}, \ldots, e_{i-1}^{(k)}, r, e_{i+1}^{(k)}, \ldots, e_{j-1}^{(k)}, r', e_{j+1}^{(k)}, \ldots, e_p^{(k)})]\} \quad \text{Eq. (6)}$$

where the $(e_i^{(k,*)}, e_j^{(k,*)})$ obtained by Eq. (6) may not be the same pair of $(e_i^{(k,*)}, e_j^{(k,*)})$ obtained from Eq. (3), but their volumes are generally very close.

5. Check if $$e_l^{(k)} = e_l^{(k,*)} \text{ for all l's with } 1 \leq l \leq p. \quad \text{Eq. (4)}$$

If yes, the algorithm is terminated. Otherwise, let $e_i^{(k+1)} = e_i^{(k,*)}$ and $e_j^{(k+1)} = e_j^{(k,*)}$. Then set $k \leftarrow k+1$ and go to step 3.

Once a 2-IN-FINDR is developed, it can be easily extended to multiple-replacement IN-FINDR where more than two endmembers can be replaced in step 5 in 2-IN-FINDR. More specifically, for any given integer s with $2 < s \leq p$ the multiple-replacement-IN-FINDR can replace s endmembers simultaneously to generate its new endmembers for next iteration, referred to as s-IN-FINDR described below.

2. s-Replacement IN-FINDR (s-IN-FINDR)

4. For any given set of s components $(j_1, \ldots, j_s)$ with $1 \leq j_1 < \ldots < j_s \leq p$ find a set of s components of $(e_{j_1}^{(k,*)}, \ldots, e_{j_s}^{(k,*)})$ which yields the maximum volume of $V(e_1^{(k)}, \ldots, e_{j_1-1}^{(k)}, r_1, e_{j_1+1}^{(k)}, \ldots, e_{j_2-1}^{(k)}, r_2, e_{j_2+1}^{(k)}, \ldots, e_{j_s-1}^{(k)}, r_s, e_{j_s+1}^{(k)}, \ldots, e_p^{(k)})$ over all s vector sample vectors $r_1, r_2, \ldots, r_s$, i.e., $$(e_{j_1}^{(k,*)}, \ldots, e_{j_s}^{(k,*)}) = \max_{r_1, \ldots, r_s} V(e_1^{(k)}, \ldots, e_{j_1-1}^{(k)}, r_1, e_{j_1+1}^{(k)}, \ldots, e_{j_2-1}^{(k)}, r_2, (e_{j_2+1}^{(k)}, \ldots, e_{j_s-1}^{(k)}, r_s, e_{j_s+1}^{(k)}, \ldots, e_p^{(k)}) \quad \text{Eq. (7)}$$

while fixing other endmembers $e_{(l)}^{(k)}$ with $l \notin \{j_1, \ldots, j_s\}$. It generally requires an extensive search for an optimal pair $(e_{j_1}^{(k,*)}, \ldots, e_{j_s}^{(k,*)})$ to satisfy Eq. (4), which is very time-consuming. One way to alleviate such a searching process is to solve two endmembers successively as follows.

$$(e_{j_1}^{(k,*)}, \ldots, e_{j_s}^{(k,*)}) = \max_{r_s} \{\max_{r_{s-1}} \{\ldots \{\max_{r_1} [V(e_1^{(k)}, \ldots, e_{j_1-1}^{(k)}, r_1, e_{j_1+1}^{(k)}, \ldots, e_{j_s-1}^{(k)}, r_s, e_{j_s+1}^{(k)}, \ldots, e_p^{(k)})]\}\}\} \quad \text{Eq. (8)}$$

where the $(e_{j_1}^{(k,*)}, \ldots, e_{j_s}^{(k,*)})$ obtained by Eq. (8) may not be the same set of $(e_{j_1}^{(k,*)}, \ldots, e_{j_s}^{(k,*)})$ obtained from Eq. (5), but their volumes are generally very close.

5. Check if $$e_l^{(k)} = e_l^{(k,*)} \text{ for all l's with } 1 \leq l \leq p. \quad \text{Eq. (4)}$$

If yes, the algorithm is terminated. Otherwise, let $$e_{j_1}^{(k+1)} = e_{j_1}^{(k,*)}, \ldots, e_{j_s}^{(k+1)} = e_{j_s}^{(k,*)}. \quad \text{Eq. (9)}$$

Then set $k \leftarrow k+1$ and go to step 3.

It should be noted that as s is increased, the computational complexity of s-IN-FINDR also grows exponentially until it reaches p, i.e., s=p when the s-IN-FINDR becomes the original version of IN-FINDR which replaces p endmembers simultaneously specified by Eq. (7).

E. SeQuential N-FINDR (SQ-N-FINDR)

According to step 2 described in the SM N-FINDR an exhaustive search must be conducted via (2) by finding an optimal set of endmembers $\{e_1^*, e_2^*, \ldots, e_p^*\}$. It requires tremendous computing time to accomplish this process. One way to mitigate this dilemma is to break up the exhaustive search process into two iterative processes, inner loop and outer loop sequentially as SeQuential N-FINDR (SQ N-FINDR) described as follows.

1. Preprocessing:

(a) Let p be the number of endmembers required to generate.
(b) Apply a maximum noise fraction (MNF) transformation (or called noise-adjusted principal component (NAPC) to reduce the data dimensionality from L to p−1 where L is the total number of spectral bands.

2. Initialization:

Let $\{e_1^{(0)}, e_2^{(0)}, \ldots, e_p^{(0)}\}$ be a set of initial vectors randomly generated from the data. Let $k=0$.

3. Outer Loop:

At iteration $k \leq 0$, find the volume of the simplex $S(e_1^{(k)}, e_2^{(k)}, \ldots, e_p^{(k)})$ specified by the p vertices $e_1^{(k)}, e_2^{(k)}, \ldots, e_p^{(k)}$, $V(e_1^{(k)}, e_2^{(k)}, \ldots, e_p^{(k)})$ defined by Eq. (1)

Stopping Rule:

For each sample vector r, we recalculate $V(r, e_2^{(k)}, \ldots, e_p^{(k)}), V(e_1^{(k)}, r, e_3^{(k)}, \ldots, e_p^{(k)}), \ldots, V(e_1^{(k)}, \ldots, e_{p-1}^{(k)}, r)$, the volumes of p simplexes, $S(r, e_2^{(k)}, \ldots, e_p^{(k)}), S(e_1^{(k)}, r, e_3^{(k)}, \ldots, e_p^{(k)}), \ldots, S(e_1^{(k)}, e_2^{(k)}, \ldots, e_{p-1}^{(k)}, r)$ each of which is formed by replacing one endmember $e_j^{(k)}$ with the sample vector r. If none of these p recalculated volumes, $V(r, e_2^{(k)}, \ldots, e_p^{(k)}), V(e_1^{(k)}, r, e_3^{(k)}, \ldots, e_p^{(k)}), \ldots, V(e_1^{(k)}, \ldots, e_{p-1}^{(k)}, r)$, is greater than $V(e_1^{(k)}, e_2^{(k)}, \ldots, e_p^{(k)})$, no endmember in $e_1^{(k)}, e_2^{(k)}, \ldots, e_p^{(k)}$ will be replaced. The algorithm is terminated. Otherwise, continue.

4. Inner Loop:

Replacement rule:

The endmember pixel which is absent in the largest volume among the p simplexes, $S(r, e_2^{(k)}, \ldots, e_p^{(k)}), S(e_1^{(k)}, r, e_3^{(k)}, \ldots, e_p^{(k)}), \ldots, S(e_1^{(k)}, e_2^{(k)}, \ldots, e_{p-1}^{(k)}, r)$ will be replaced by the sample vector r. Assume that such an endmember is denoted by $e_j^{(k-1)}$. A new set of endmembers is then produced by letting $e_j^{(k+1)} = r$ and $e_i^{(k+1)} = e_i^{(k)}$, for $i \neq j$. Let $k \leftarrow k+1$ and go to step 2.

F. SuCcessive SC N-FINDR

However, step 3 of the above SQ N-FINDR must be carried out for each data sample vector r and such a process also requires a significant amount of computations. In order to further reduce computational complexity, a SuCcessive N-FINDR (SC N-FINDR) derived from the above SQ N-FINDR is developed with two significant improvements. One is there is no pre-processing of dimensionality reduction required in step 1 by both SM N-FINDR and SQ N-FINDR. Secondly, since initially selected endmembers for algorithm initialization have crucial impact on final selected endmembers, the SC N-FINDR combines advantages of the SM-N-FINDR and the SQ N-FINDR by adding a new iterative step by re-input the found endmembers as a new set of initial endmembers to re-run the entire process again. A detailed implementation of the proposed SC N-FINDR is described below.

1. Initialization:

Let $\{e_1^{(0)}, e_2^{(0)}, \ldots, e_p^{(0)}\}$ be a set of the first p data sample vectors. Set $k=0$.

3. For $1 \leq j \leq p$ find $e_j^{(k,*)}$ which yields the maximum volume of $V(e_1^{(k,*)}, \ldots, e_{j-1}^{(k,*)}, r, e_{j+1}^{(k)}, \ldots, e_p^{(k)})$ over all sample vectors r, while fixing other endmembers $e_i^{(k,*)}$ with $i<j$ and $e_i^{(k)}$ with $i>j$. That is, $$e_j^{(k,*)} = \max_r V(e_1^{(k,*)}, \ldots, e_{j-1}^{(k,*)}, r, e_{j+1}^{(k)}, \ldots, e_p^{(k)}). \quad \text{Eq. (3)}$$

4. Check if the stopping rule specified by Eq. (4) is satisfied. If yes, go step 5. Otherwise, let $$e_j^{(k+1)} = e_j^{(k,*)} \quad \text{Eq. (4)}$$

and set $k \leftarrow k+1$. Then go to step 3.

5. Check if $$e_j^{(k)} = e_j^{(0)} \text{ for } 1 \leq j \leq p. \quad (4)$$

If (4) is satisfied, the algorithm is terminated. Otherwise, use the newly found p endmembers $\{e_1^{(k)}, e_2^{(k)}, \ldots, e_p^{(k)}\}$ as a new set of initial endmembers to replace the previous p initial endmembers $\{e_1^{(0)}, e_2^{(0)}, \ldots, e_p^{(0)}\}$ i.e., $e_j^{(0)} \leftarrow e_j^{(k)}$ for $1 \leq j \leq p$ and go to step 1.

There is one major difference between SQ N-FINDR and SC N-FINDR which is steps 3-4 on how unwanted endmembers with desired endmembers carried out by steps 3-4 implemented in these two algorithms. In other words, the SQ N-FINDR always replaces endmembers that yields the smallest volume among all the previously generated endmembers, while the SC N-FINDR only replaces the one currently being processed.

II. Simplex Growing Algorithm (SGA)

The endmember extraction algorithm Simplex Growing Algorithm (SGA) can be considered as another sequential version of SM N-FINDR. Unlike SC N-FINDR which starts with a randomly generated p-vertex simplex and then successively replaces one vertex at one time, SGA starts with one vertex and then begins to grow a simplex by one vertex at a time until it reaches p vertices. The key to making SGA work hinges on how to appropriately select new vertices to augment growing simplexes.

According to N-FINDR for a given positive integer p a simplex formed by p endmembers is one that produces the maximum volume among all possible simplexes formed by any set of p data sample vectors. Using this as a criterion SGA grows the current k-vertex simplex $S(e^{(0)}, e^{(1)}, \ldots, e^{(k-1)})$ to a (k+1)-vertex simplex $S(e^{(0)}, e^{(1)}, \ldots, e^{(k-1)}, e^{(k)})$ by finding a new $k+1^{st}$ vertex $e^{(k)}$ so that the new (k+1)-vertex simplex $S(e^{(0)}, e^{(1)}, \ldots, e^{(k-1)}, e^{(k)})$ produces its volume no less than volumes of all possible (k+1)-vertex simplexes $S(e^{(0)}, e^{(1)}, \ldots, e^{(k-1)}, r)$ augmented by any other data sample vector r. The detailed implementation of the above growing simplex process is summarized as follows.

1. Initialization:

(a) Let p be the number of endmembers to be generated.

(b) There are two ways to generate random initial endmembers for SGA.

(i) Randomly select a data sample vector as an initial endmember $e^{(0)}$ and set k=0. In this case, the SGA is referred to as 1-SGA.

(ii) Randomly select a pair of two data sample vectors $(e^{(0)}, e^{(1)})$ to form as a random degenerate 2-dimensional simplex which is a line segment connecting $e^{(0)}$ and $e^{(1)}$. Set k=1. In this case, the SGA is referred to as 2-SGA.

2. At $k \geq 0$ and for each sample vector r, we calculate $V(e^{(0)}, \ldots, e^{(k)}, r)$ defined by $$V(e^{(0)}, \ldots, e^{(k)}, r) = \frac{\left|\det\begin{bmatrix} 1 & 1 & \cdots & 1 & 1 \\ e^{(0)} & e^{(1)} & \cdots & e^{(k)} & r \end{bmatrix}\right|}{k!}. \quad \text{Eq. (10)(14)}$$

which is the volume of the simplex specified by vertices $e^{(0)}, e^{(1)}, \ldots, e^{(k)}, r$, denoted by $S(e^{(0)}, e^{(1)}, \ldots, e^{(k)}, r)$. Since the matrix $$\det\begin{bmatrix} 1 & 1 & \cdots & 1 & 1 \\ e^{(0)} & e^{(1)} & \cdots & e^{(k)} & r \end{bmatrix}$$

is not necessarily a square matrix, a dimensionality reduction technique such as PCA or MNF is required to reduce the original data dimensionality L to the dimension k.

3. Find $e^{(k+1)}$ that yields the maximum, that is, $$e^{(k+1)} = \arg\{\max_r V(e^{(0)}, \ldots, e^{(k)}, r)\} \quad \text{Eq. (11) (15)}$$

4. Stopping Rule:

If $k=p-1$, then $k \leftarrow k+1$ and go step 2. Otherwise, the final set of $\{e^{(1)}, e^{(2)}, \ldots, e^{(p)}\}$ is the desired p endmembers.

Despite that both SGA and SC N-FINDR can be viewed as sequential versions of SM N-FINDR, two fundamental differences are noteworthy. One is that SGA grows simplexes via (11) starting from a single-vertex simplex compared to SC N-FINDR which performs in a complete opposite manner that it actually shrinks simplexes by reducing the number of finding new searched vertices via Eq. (3). More specifically, SC-N-FINDR starts off a p-vertex simplex whose vertices are randomly generated. It then begins to replace these random vertices one by one with a new vertex that maximizes the volume of a simplex with a reduced number of vertices yet to be replaced while keeping those new vertices that are already found to replace old ones.

The advantage of SGA over SC N-FINDR is that SGA keeps previously found vertices while growing its simplexes as p is increased, whereas SC N-FINDR must re-start the entire process again once p is changed. In other words, SGA finds its new generated endmembers and works its way up one at a time to grow simplexes versus SC-N-FINDR which works its way down one at a time by shrinking simplexes in the sense of reducing the number of finding new endmembers. Nevertheless, from a computational complexity view point both SGA and SC N-FINDR require the same number of comparisons, p(p-1)/2 for each data sample vector.

The second fundamental difference is the use of random initial conditions. SGA only requires one randomly generated endmember to initialize the algorithm compared to SC N-FINDR which needs p randomly generated endmembers for initialization. In this case, both SGA and SC N-FINDR share something in common, that is, their performance is determined by their initial conditions. As a result, a judicious selection of initial conditions becomes is key.

III. Causal N-FINDR and SGA Algorithms

A. Causal IN-FINDR

1. Initial Condition: Assume that $\{r_i\}_{i=1}^N$ are data sample vectors inputted according to $1, 2, \ldots, N$ and set count=0.

2. Input the first p pixel vectors $r_1, r_2, \ldots, r_p$ as p initial endmembers, $E^{(0)} = \{e_1^{(0)}, e_2^{(0)}, \ldots, e_p^{(0)}\}$ by setting $r_i = e_i^{(0)}$. Let k=0.

3. For a pixel vector, $r_i$ for $i \geq p+1$ find $V(r_i, e_2^{(k)}, \ldots, e_p^{(k)})$, $V(e_1^{(k)}, r_i, e_3^{(k)}, \ldots, e_p^{(k)}), \ldots, V(e_1^{(0)}, \ldots, e_{p-1}^{(0)}, r_i)$, the volumes of p simplexes, $S(r_i, e_2^{(k)}, \ldots, e_p^{(k)})$, $S(e_1^{(k)}, r_i,$ $e_3^{(k)}, \ldots, e_p^{(k)}), \ldots, S(e_1^{(k)}, e_2^{(k)}, \ldots, e_{p-1}^{(k)}, r_i)$. If none of p volume is greater than $V(e_1^{(k)}, e_2^{(k)}, \ldots, e_p^{(k)})$, go to step 5. Otherwise, continue.

4. Replacement Rule:

Assume that the endmember pixel $e_j^{(k)}$ which is absent in the largest volume among the p simplexes, $S(r_i, e_2^{(k)}, \ldots, e_p^{(k)})$, $S(e_1^{(k)}, r_i, e_3^{(k)}, \ldots, e_p^{(k)}), \ldots, S(e_1^{(k)}, e_2^{(k)}, \ldots, e_{p-1}^{(k)}, r_i)$ will be replaced by the sample vector $r_i$, which will be re-labeled by $e_j^{(k+1)}$. A new set of endmembers is then produced by letting $e_j^{(k+1)} = r_i$ and $e_n^{(k+1)} = e_n^{(k)}$ for $n \neq j$. Or more specifically, find j* which satisfies $$j^* = \arg\max_{1 \leq j \leq p} V(e_1^{(k)}, \ldots, e_{j-1}^{(k)}, r_i, e_{j+1}^{(k)}, \ldots, e_p^{(k)})$$
Eq. (12)

Substitute $r_i$ for $e_{j^*}^{(k)}$ by letting $e_{j^*}^{(k)} \leftarrow r_i$ and $e_n^{(k+1)} = e_n^{(k)}$ for $n \neq j^*$.

1. If the next pixel vector $r_i$ is not the last pixel vector of the image cube, set $k \leftarrow k+1$, $i \leftarrow i+1$ and go to step 3. Otherwise, continue 2. In this case, $r_i = r_N$, check if $$E^k = \{e_1^{(k)}, e_2^{(k)}, \ldots, e_p^{(k)}\}, E^{k-1} = \{e_1^{(k-1)}, e_2^{(k-1)}, \ldots, e_p^{(k-1)}\}$$
Eq. (13)

If yes, no replacement is needed and the algorithm is terminated. Otherwise, continue.

5. Use the resulting $E^{(k)} = \{e_1^{(k)}, e_2^{(k)}, \ldots, e_p^{(k)}\}$ as a new set of initial endmembers and reset $e_j^{(k)} = e_j^{(0)}$ for all $1 \leq j \leq p$ and $E^{(k)} \leftarrow E^{(0)}$. Set count←count+1 and go to step 2.

Figure 2:
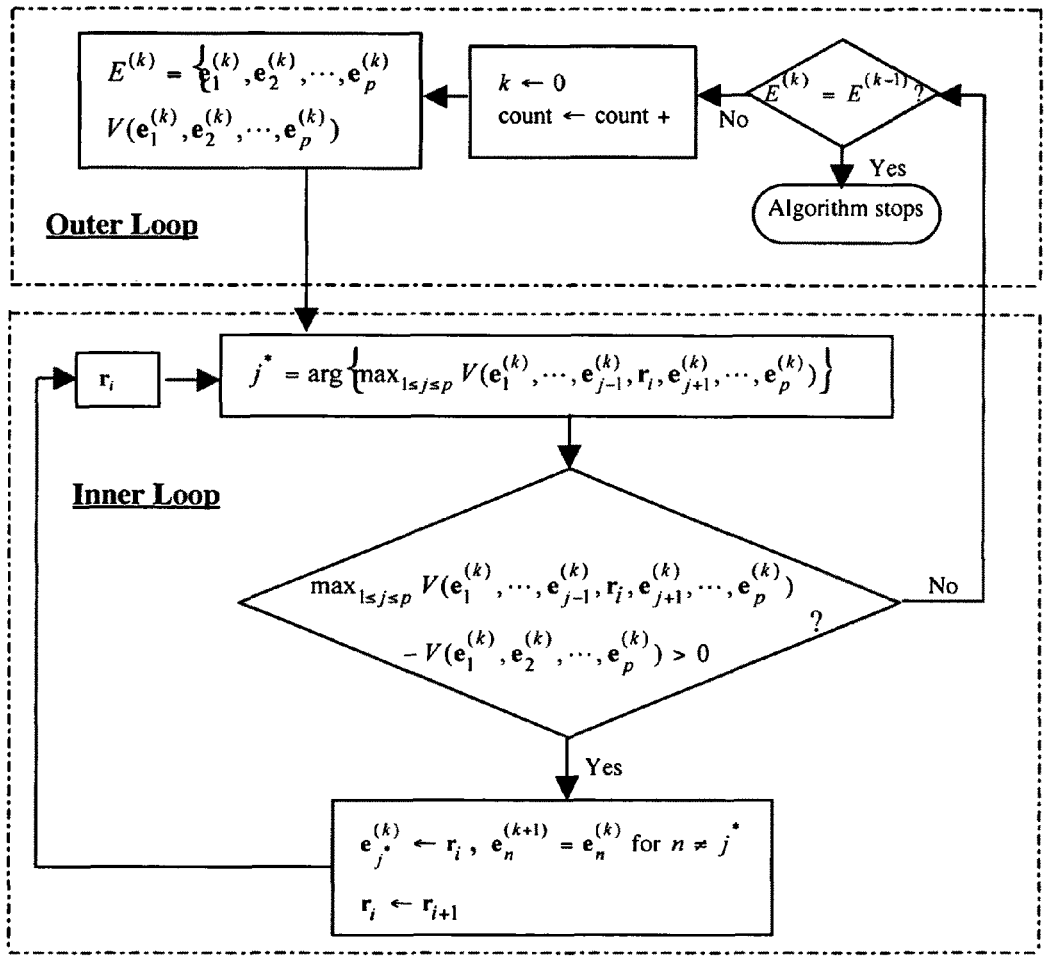
FIG. 2 is a flow chart of two loops, the outer loop and the inner loop, implemented by Causal IN-FINDR.

FIG. 2 delineates a flow chart of the Causal IN-FINDR which decomposes the algorithm into two loops, inner loop and outer loop. The index k is actually k=i−p which keeps track of how many iterations have been run by the inner loop. The count index used in the outer loop is used to dictate how many times the outer loop should be run. Unlike the index k used in the inner loop which is always equals N−p, the count index is not a constant and it is indeed determined by the data.

If the current data sample vector is $r_m$ the Causal IN-FINDR can be considered as IN-FINDR for the data set made up of all data sample vectors up to $r_m$, i.e., $\{r_i\}_{i=1}^m$. Therefore, the optimal endmember set found by the Causal IN-FINDR may not be the same one found by IN-FINDR until the data sample vector to be processed reaches the last data sample vector $r_N$ in which case the Causal IN-FINDR essentially becomes the IN-FINDR. It should be noted that step 3 described in the above Causal IN-FINDR must be carried out for each data sample vector r. Such a process also requires a significant amount of computation.

B. Causal SQ N-FINDR

The Causal IN-FINDR described in FIG. 2 is actually implemented by two loops, outer and inner loops where the inner loop is executed based on a given set of initial endmembers while the outer loop is designed to take care of inconsistency caused by any initial set of endmembers. However, according to our extensive conducted experiments the Causal IN-FINDR only runs the inner loop without executing the outer loop generally gives close results in most cases. An algorithm that implements only the inner loop of the Causal IN-FINDR is called Causal SeQuence N-FINDR (SQ N-FINDR) with its flow chart specified by the inner loop in FIG. 2 and its step-by-step implementation described below.

1. Initial Condition:

Assume that $\{r_i\}_{i=1}^N$ are data sample vectors inputted according to 1, 2, . . . , N. Input the first p pixel vectors $r_1, r_2, \ldots, r_p$ as p initial endmembers, $E^{(0)} = \{e_1^{(0)}, e_2^{(0)}, \ldots, e_p^{(0)}\}$ by setting $r_i = e_i^{(0)}$.

2. For a pixel vector, $r_i$ for $i \geq p+1$ find j* which satisfies $$j^* = \arg\max_{1 \leq j \leq p} V(e_1^{(k)}, \ldots, e_{j-1}^{(k)}, r_i, e_{j+1}^{(k)}, \ldots, e_p^{(k)})$$
Eq. (14)

3. Substitute for $e_{j^*}^{(k)}$ by letting $e_{j^*}^{(k)} \leftarrow r_i$. Set $i \leftarrow i+1$.

4. Check if the next pixel vector $r_{i+1}$ is not the last pixel vector of the image cube. If it is not, go to step 2. Otherwise, the algorithm is terminated and the resulting $\{e_1^{(k)}, e_2^{(k)}, \ldots, e_p^{(k)}\}$ is the final set of p endmembers.

Note that the inner loop described in the flow chart of Causal SQ N-FINDR in FIG. 2 can be considered the first pass performed by the Causal IN-FINDR. The count index used in the outer loop of the Causal IN-FINDR keeps track of the number of times by resetting k to k=0 which is exactly the number of passes required for running the Causal SQ N-FINDR. With this interpretation the Causal IN-FINDR can be considered as a Multiple-Pass Causal SQ N-FINDR where the number of passes is determined by the count index used in the outer loop.

In Causal SQ N-FINDR it requires computation of the volume of a p-vertex simplex p times for each data sample $r_i$ after the first p samples, i.e., i>p. To further reduce computational complexity requires finding one optimal endmember at a time in a successive manner while the other endmembers remaining fixed. As a result of such a successive process a significant reduction in computational complexity can be achieved. Two such algorithms, Causal Circular N-FINDR and Causal SC N-FINDR can be designed and derived from Causal SQ N-FINDR.

1. Causal Circular N-FINDR

The Causal Circular N-FINDR can be considered as a special case of Causal SQ N-FINDR. Causal SQ N-FINDR must calculate p simplex volumes for each input data sample and must replace the one which yields the minimum simplex volume among the computed p simplex volumes. In Causal Circular N-FINDR, for each input data sample vector the algorithm only computes one simplex volume and replaces an endmember at a time, if necessary.

Initially, Causal Circular N-FINDR inputs the first p data samples to form an initial simplex $S(e_1^{(0)}, \ldots, e_j^{(0)}, \ldots, e_p^{(0)})$ by letting $e_j^{(0)} = r_j$ and calculates its volume. Then it inputs the $(p+1)^{st}$ data sample vector, $r_{p+1}$ and uses it to replace the $1^{st}$ initial endmember $e_1^{(0)}$ which is the first data sample $r_1$ and calculates the volume of the new simplex formed by $S(r_{p+1}, e_2^{(0)}, \ldots, e_p^{(0)})$. If $V(r_{p+1}, e_2^{(0)}, \ldots, e_p^{(0)}) > V(e_1^{(0)}, e_2^{(0)}, \ldots, e_p^{(0)})$, $e_1^{(0)}$ is replaced with $r_{p+1}$ and let $e_1^{(1)} = r_{p+1}$ be a new $1^{st}$ endmember. Otherwise, no replacement is necessary and let $e_1^{(1)} = e_1^{(0)}$.

Then, the $(p+2)^{nd}$ data sample vector, $r_{p+2}$, is inputted and compute the volume of a new simplex, $S(e_1^{(1)}, r_{p+2}, e_3^{(0)}, \ldots, e_p^{(0)})$ is computed. If $V(e_1^{(1)}, r_{p+2}, e_3^{(0)}, \ldots, e_p^{(0)}) > V(e_1^{(1)}, e_2^{(0)}, \ldots, e_p^{(0)})$, the $2^{nd}$ initial endmember, which is $r_2$, is replaced with $r_{p+2}$ and let $e_2^{(1)} = r_{p+2}$. Otherwise, no replacement is necessary by letting $e_2^{(1)} = e_2^{(0)}$. The same process continues on by shifting one endmember at a time until it finishes a complete cycle of the first p initial endmembers in which case we have a complete new set of p endmembers $\{e_1^{(1)}, \ldots, e_j^{(1)}, \ldots, e_p^{(1)}\}$ Using this newly generated endmember set as a new initial set of endmember we begin another new cycle by inputting the $r_{2p+1}$ data sample vector and compute the volume of a new simplex, $S(r_{2p+1}, e_2^{(1)}, \ldots, e_p^{(1)})$. If $V(r_{2p+1}, e_2^{(1)}, \ldots, e_p^{(1)}) > V(e_1^{(1)}, e_2^{(1)}, \ldots, e_p^{(1)})$, we replace the $1^{st}$ endmember which is $e_1^{(1)}$ with $r_{2p+1}$ and let $e_1^{(1)} = r_{2p+1}$. Otherwise, no replacement is necessary by letting $e_1^{(2)} = e_1^{(1)}$. The same process is then repeated for the $2^{nd}$ cycle to generate a $2^{nd}$ new set of endmembers, $\{e_1^{(2)}, \ldots, e_j^{(2)}, \ldots, e_p^{(2)}\}$ and a third circle, etc. until it reaches the last data sample vector $r_N$ where the process is terminated. The detailed implementation of this Causal Circular N-FINDR is described below.

1. Initial Condition:

Assume that $\{r_i\}_{i=1}^N$ are data sample vectors inputted according to 1, 2, ..., N. Input the first p pixel vectors $r_1, r_2, \ldots, r_p$ as p initial endmembers, $\{e_1^{(0)}, e_2^{(0)}, \ldots, e_p^{(0)}\}$ by setting $r_i = e_i^{(0)}$. Set k=0 and j=1≡ĵ (mod p) where ĵ=kp+j for some non-negative integer k.

2. Let $(kp+\hat{j})^{th}$ pixel vector in the image cube data be denoted by $r_{kp+\hat{j}}$, calculate $V(e_1^{(k)}, \ldots, e_{j-1}^{(k)}, r_{kp+\hat{j}}, e_{j+1}^{(k)}, \ldots, e_p^{(k)})$, the volume of $S(e_1^{(k)}, \ldots, e_{j-1}^{(k)}, r_{kp+\hat{j}}, e_{j+1}^{(k)}, \ldots, e_p^{(k)})$, and check if $V(e_1^{(k)}, \ldots, e_{j-1}^{(k)}, r_{kp+\hat{j}}, e_{j+1}^{(k)}, \ldots, e_p^{(k)}) \leq V(e_1^{(k)}, \ldots, e_{j-1}^{(k)}, e_j^{(k)}, e_{j+1}^{(k)}, \ldots, e_p^{(k)})$. If it is, go to step 5. Otherwise, continue.

4. Replacement Rule:

The endmember pixel $e_j^{(k)}$ will be replaced by the sample vector $r_{p+j}$ and will be re-labeled by $e_j^{(k+1)}$. A new set of endmembers is then produced by letting $e_j^{(k+1)} = r_{kp+\hat{j}}$ and $e_i^{(k+1)} = e_i^{(k)}$ for i≠j. Go to step 6.

5. Stopping Rule:

In this case, no replacement is needed and the algorithm is terminated in which case the $j^{th}$ endmember is identified as a final endmember.

6. If the next pixel vector $r_{i+1}$, $r_{i+1} \neq r_N$, let k←k+1 and j←j+1. Find j≡ĵ(mod p) and go to step 2. Otherwise, the algorithm is terminated.

According to the above implementation the initial endmembers used by the Causal Circular N-FINDR may have a significant impact on final selected endmembers since it starts with the $1^{st}$ initial endmember, $e_1^{(0)}$ which is the $1^{st}$ data sample vector $r_1$. The same algorithm can also start with the $2^{nd}$ initial endmember $e_2^{(0)}$ which is the $2^{nd}$ data sample vector $r_2$, the $3^{rd}$ initial endmember, $e_2^{(0)}$ which is the $3^{rd}$ data sample vector $r_3$, and so forth, until the $p^{th}$ initial endmember $e_p^{(0)}$ which is the $p^{th}$ data sample vector $r_p$, that completes a cycle of p passes in which each initial endmember has its own opportunity to be started as the first endmember to initialize the Causal Circular N-FINDR. The Causal Circular N-FINDR implemented in such a way is called p-pass Causal Circular N-FINDR and similar to the Causal IN-FINDR which can be considered as Multiple-Pass SQ N-FINDR.

Another alternative is to re-run again the above Causal Circular N-FINDR which always uses the first initial endmember to start the Causal Circular N-FINDR to achieve better performance. If such a re-run is considered as one pass, a Multiple-Pass Causal Circular N-FINDR is actually the one which implements a Causal Circular N-FINDR in multiple runs where the final set of endmembers generated by a Causal Circular N-FINDR in a preceding run is used as an initial set of a Causal Circular N-FINDR in the following run.

That is, a Multiple-Pass Causal Circular N-FINDR re-runs the Causal Circular N-FINDR as a second round process using the final p endmembers found in its first round process as a new set of initial endmembers. The final set of p endmembers found by a second run of the Causal Circular N-FINDR should result in a better set of p endmembers than those p endmembers found by its first round. Similarly, the same process can be repeated over and over again for the $3^{rd}$ round Causal Circular N-FINDR using the $2^{nd}$ round found p endmembers as a new initial set of p endmembers, the $4^{th}$ round Causal Circular N-FINDR using the $3^{rd}$ round found p endmembers as a new initial set of p endmembers, and so on.

The number of passes the Causal Circular N-FINDR should be run is determined by the final sets of endmembers found by two consecutive runs are identical. In this case, the Multiple-Pass Causal Circular N-FINDR is slightly different from the above defined p-pass Causal Circular N-FINDR which requires p runs to complete its p initial endmembers to be used for initialization instead of re-running the same Causal Circular N-FINDR over and over again in multiple passes. According to our experiments, it seems that the number of passes required for Multiple-Pass Causal Circular N-FINDR is generally very smaller and less than p.

The difference between Causal SQ N-FINDR and Causal Circular N-FINDR is their replacement rules described in step 4. The Causal SQ N-FINDR replaces the endmember which yields the smallest simplex volume among all the existing p endmembers as a new data sample vector comes in as opposed to the Causal Circular N-FINDR which only replaces one endmember at a time in a circular order starting from j=1 to j=p. And for each j, the endmembers to be replaced are always those with indexes of multiples of j. Two reasons for the Causal Circular N-FINDR to be implemented in such a circular order are 1) to make sure that all initial endmembers have equal opportunity to be replaced if necessary and 2) to reduce computational complexity to calculating a p-vertex simplex volume only once at a time instead of p-vertex simplexes p times at a time required by the Causal SQ N-FINDR. As a result, the Causal SQ N-FINDR requires an additional register to record the endmember to be replaced during the data processing, while the Causal Circular N-FINDR does not.

A major advantage of using the Causal IN-FINDR over the Causal Circular N-FINDR is that the initially selected endmembers are immaterial since the found p endmembers by the Causal SQ N-FINDR, i.e., the inner loop of the Causal IN-FINDR will be updated by the outer loop if the set of p endmember found in the inner loop is not an optimal set. This is quite different from that carried out by the Causal Circular N-FINDR which updates one endmember at a time by a new input data sample vector until it reach the last data sample and stops. It only executes only one loop and does not have a similar outer loop to the one used by the Causal IN-FINDR.

However, in order for the Causal Circular N-FINDR to perform like the Causal IN-FINDR, the Causal Circular N-FINDR must include an outer loop to update the endmembers sets generated by the Causal Circular N-FINDR. This can be accomplished by the above mentioned Multiple-Pass Causal Circular N-FINDR which is very similar to the Causal IN-FINDR. Both use the idea of passes to describe how many time required to re-run the same algorithm where the Multiple-Pass Causal SQ N-FINDR uses the counter index in the outer loop by the Causal IN-FINDR.

Despite the fact that the Multiple-Pass Causal Circular N-FINDR is not a real-time processing algorithm since each new pass creates an extra time lag for Causal Circular N-FINDR, it can be considered as a near real-time processing algorithm, if the time lag is negligible. The same conclusion also is applied to the Causal IN-FINDR where the count index determines the number of times to run the outer loop, i.e., number of passes required for the Causal IN-FINDR before it is terminated. The Causal IN-FINDR and Multiple-Pass Causal Circular N-FINDR discussed above may not be able to produce outputs in real time if too many passes are required but they are still considered as a causal processing because the processing they execute requires no future data sample vectors to update endmembers.

2. p-Pass Causal SC N-FINDR

When the Causal IN-FINDR, i.e., Multiple-Pass Causal SQ N-FINDR, and Multiple-Pass Causal Circular N-FINDR described above are performed, there is no knowledge about how many passes will be required before the algorithms are terminated. p-Pass Causal SC N-FINDR is more easily implemented than the Causal IN-FINDR and Multiple-Pass Causal SC N-FINDR. p-Pass Causal SC N-FINDR combines the concept of the Causal SQ N-FINDR and Multiple-Pass Causal Circular N-FINDR to perform as if it is the Causal IN-FINDR except that it is known exactly how many passes the algorithm should run, which is the number of endmembers, p.

1. Initial Condition:

It is stated that j=1 and let $e_0 = \emptyset$.

2. At the $j^{th}$ pass, the $j^{th}$ endmember $e_j$ are supposed to be found and the endmembers $e_1, e_2, \ldots, e_{j-1}$ prior to the $j^{th}$ endmember $e_j$ are assumed to be known. $\{r_i\}_{i=1}^N$ are data sample vectors inputted according to $1, 2, \ldots, N$. Let i=1.

3. For $r_i \notin \{e_1, e_2, \ldots, e_{j-1}\}$ calculate the volume of simplex, $S(e_1, \ldots, e_{j-1}, r_i, e_{j+1}, \ldots, e_p)$ and set max_volume(j)= $V(e_1, \ldots, e_{j-1}, r_i, e_{j+1}, \ldots, e_p)$. Then calculate $V(e_1, \ldots, e_{j-1}, r_{i+1}, e_{j+1}, \ldots, e_p)$ and compare it to max_volume(j). If $V(e_1, \ldots, e_{j-1}, r_{i+1}, e_{j+1}, \ldots, e_p) > $ max_volume(j), then max_volume(j) $\leftarrow V(e_1, \ldots, e_{j-1}, r_{i+1}, e_{j+1}, \ldots, e_p)$ and check if $$r_{i+1} = r_N. \qquad \text{Eq. (15)}$$

4. If Eq. (15) is not true let $i \leftarrow i+1$ and go to step 3. Otherwise, continue.

5. In this case, the $j^{th}$ endmember $e_j$ is found and continue to find the next $(j+1)^{st}$ endmember, $e_{j+1}$. If j=p, the algorithm is terminated. Otherwise, let $j \leftarrow j+1$ and go to step 1.

Interestingly, if the above p-Pass Causal SC N-FINDR is compared to the Multiple-Pass Causal SQ N-FINDR and Multiple-Pass Causal Circular N-FINDR described above, the latter requires a variable number of passes to complete its search for p endmembers and generally needs fewer passes than p passes required by a p-pass SC N-FINDR. Finally, it should be noted that all the causal versions of N-FINDR presented in this section, Causal IN-FINDR (Multiple-Pass Causal SQ N-FINDR), Causal SQ N-FINDR, Causal Circular N-FINDR, Multiple-Pass Causal Circular N-FINDR and p-Pass Causal SC N-FINDR, do not require dimensionality reduction as does the SM N-FINDR. This advantage allows algorithms to be applicable to feasibility of real time processing.

C. Causal Processing of SGA: 1. Causal p-Pass SGA

Implementing Causal SGA is quite different from that designed for causal N-FINDR where there are fixed number of endmembers available to be processed, e.g., p endmembers in N-FINDR. By contrast, the SGA grows endmembers from 1 to p where the number of endmembers is increased by one as the algorithm finds one endmember at a time. Therefore, technically, it is impossible to implement SGA in real time. However, using the p-Pass Causal SC N-FINDR as a bridging idea we can implement SGA as a p-Pass SGA in a similar manner that the p-Pass Causal SC N-FINDR does except that after each pass the p-Pass SGA grows one endmember compared to the p-Pass Causal SC N-FINDR which always has p endmembers to work with. Consequently, the p-Pass SGA requires p passes to complete its finding of p endmembers. Assume that $\{r_i\}_{i=1}^N$ are data sample vectors inputted according to $1, 2, \ldots, N$ and p is the number of endmembers required for SGA to generate. The p-Pass Causal SGA is very similar to the p-Pass Causal SC N-FINDR.

1. Initial Condition: No any initial endmember is required.
2. Finding the $j^{th}$ endmember for $1 \leq j \leq p$ and set k=1.

3. For $r_k \notin \{e_1, e_2, \ldots, e_{j-1}\}$ calculate the volume of simplex, $S(e_1, \ldots, e_{j-1}, r_k)$ and set max_volume(j)= $V(e_1, \ldots, e_{j-1}, r_k)$. Then calculate $V(e_1, \ldots, e_{j-1}, r_{k+1})$ and compare it to $S(e_1, \ldots, e_{j-1}, r_1)$. If max_volume(j) < $V(e_1, \ldots, e_{j-1}, r_{k+1})$, then max_volume(j) $\leftarrow V(e_1, \ldots, e_{j-1}, r_{k+1})$ and check if $$r_{k+1} = r_N. \qquad \text{Eq. (16)}$$

It should be noted that since no volume is defined for a single vertex simplex, a one-vertex simplex has zero volume. In this degenerated case, for j=1, $\{e_1, e_2, \ldots, e_{j-1}\} = \emptyset$ and $S(e_1, \ldots, e_{j-1}, r_k)$ is reduced to $S(r_k)$ which is a vertex in which case $V(r_k)$ is defined as spectral value of $r_k$ and max_volume(k)= max$\{r_k, r_{k+1}\}$.

As a matter of fact, for j=1, the first endmember $e_1$ can be generated by finding a data sample vector in the data with the maximum length, i.e., $e_1 = \arg\{\max_{1 \leq i \leq N}\{\|r_i\|\}\}$. This pass can be easily executed by real time processing by starting off the first data sample vector $r_1$ and comparing the second data sample vector $r_2$. Let max(2)=arg$\{\max_{\{1,2\}}\{\|r_1\|, \|r_2\|\}\}$. Then for the k-th data sample vector, $r_k$ with $k \geq 3$, find max(k+1)= arg$\{\max_{\{max\{k\}, k+1\}}\{\|r_{max\{k\}}\|, \|r_{k+1}\|\}\}$ until $r_k$ reaches $r_N$ and $e_1 \leftarrow r_{max\{N\}}$.

4. If Eq. (16) is not true, let $k \leftarrow k+1$ and go to step 3. Otherwise, continue.

5. In this case, the $j^{th}$ endmember $e_j$ is found and continue to find the next $(j+1)^{st}$ endmember, $e_{j+1}$. If j=p, the algorithm is terminated. Otherwise, let $j \leftarrow j+1$ and go to step 2.

Figure 3:
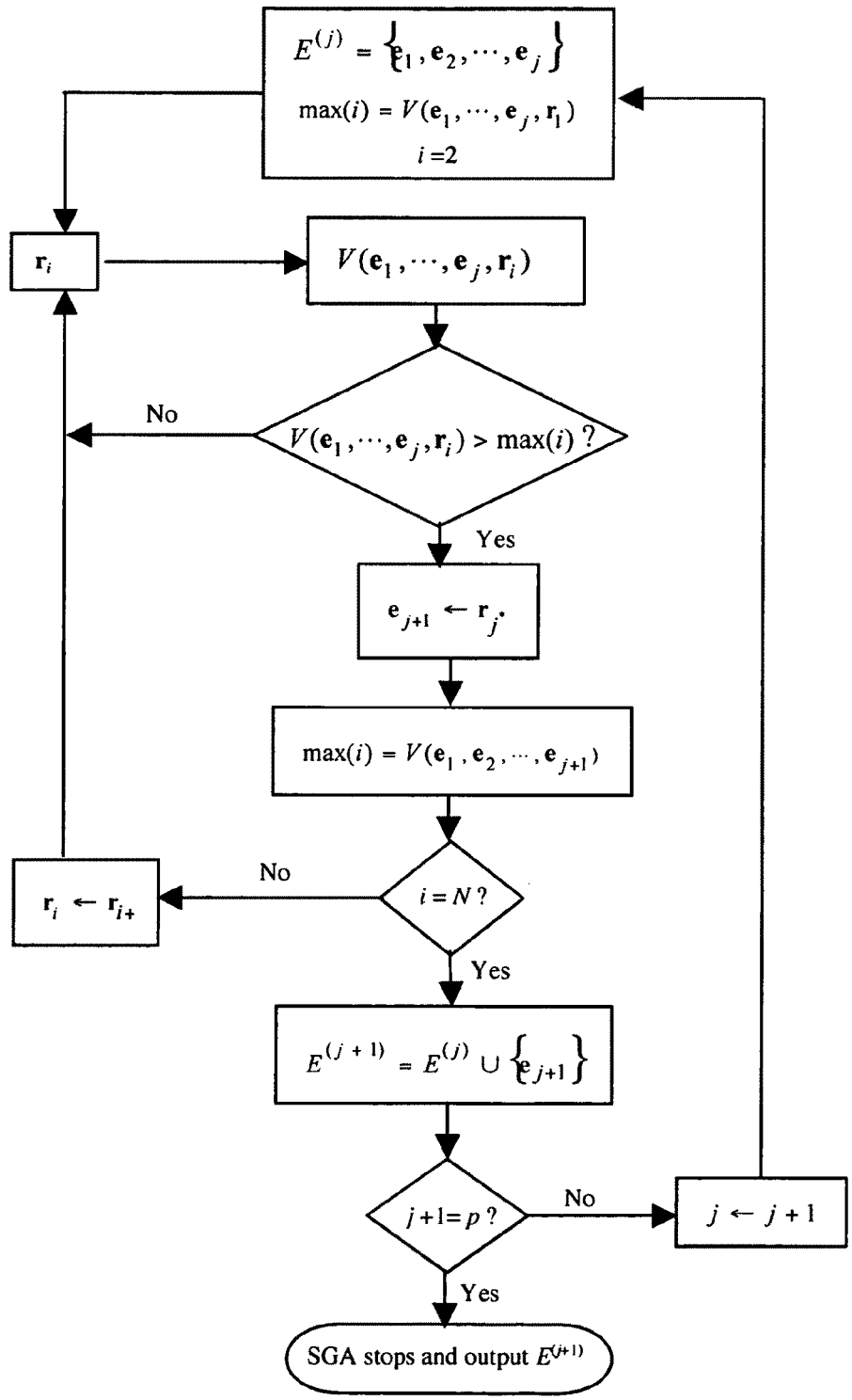
FIG. 3 is flow chart of (p−j)-Pass Causal SGA for any $0 \leq j \leq p-1$.
Figure 4A:
FIG. 4A-4D are graphical representations of finding the first 4 endmembers, $e_1$ (FIG. 4A), $e_2$ (FIG. 4B), $e_3$ (FIG. 4C) and $e_4$ (FIG. 4D) by p-Pass Causal SGA.
Figure 4B:
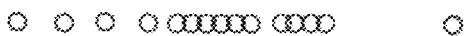
Figure 4C:
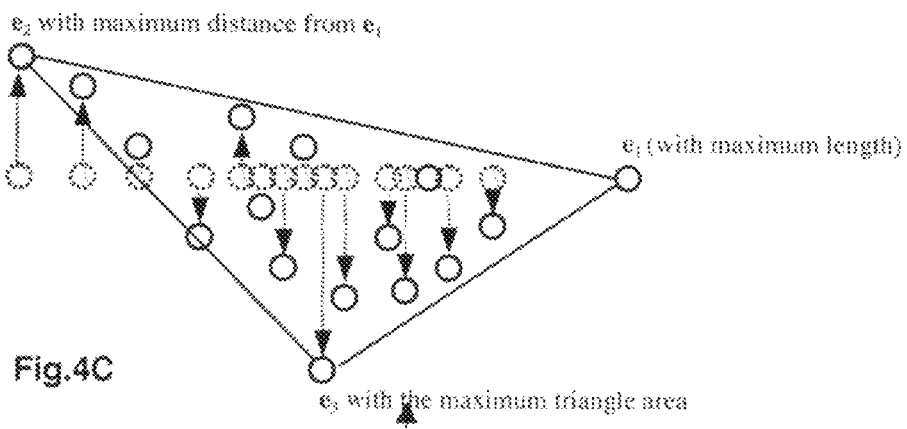
Figure 4D:
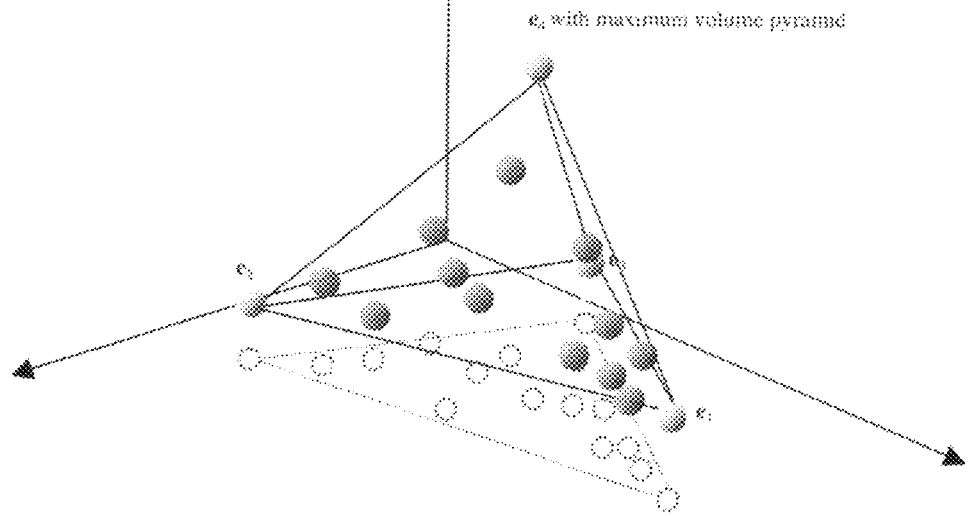

FIG. 3 depicts a flow chart of the implementation of a j-pass SGA where j can start off from j=1.

2. (p–j)-Pass Causal SGA

The p-pass SGA can be extended to a general version, (p–j)-pass SGA where j represents the number of vertices of a starting simplex from which the SGA grows. FIG. 4 graphically depicts finding the first 4 endmembers $e_1$-$e_4$.

1. More specifically, a. when j=0 the (p–j)-pass SGA is reduced to the p-pass SGA described above which requires no initial condition at all;

b. when j=1 the p-pass SGA is extended to the (p–1)-pass SGA which assumes the knowledge of $e_1$ as the first initial endmember. In this case, j starts with 2 where $r_k \notin \emptyset$, $S(r_k)$ and $V(r_k)$ in step 2 of p-pass SGA are replaced with $r_k \notin \{e_1\}$, $S(e_1, r_k)$ which is a 2-vertex simplex and its volume $V(e_1, r_k)$ which is defined as the length between $e_1$ and $r_k$. As a result, (p–1)-pass SGA must run (p–1) times, i.e., p–1 passes to grow (p–1) simplexes in order to find p–1 endmembers $\{e_2, e_3, \ldots, e_p\}$ by starting from 2-vertex simplex $S(e_1, e_2)$, 3-vertex simplex $S(e_1, e_2, e_3)$ to p-vertex simplex, $S(e_1, \ldots, e_{p-1}, e_p)$.

c. when j=p–1 the (p–j)-pass SGA becomes 1-pass SGA where the SGA starts with a (p–1)-vertex simplex as an initial simplex and only needs to run one pass in finding one more endmember $e_p$ to complete a desired p-vertex simplex $S(e_1, \ldots, e_{p-1}, e_p)$.

The (p–j)-Pass Causal SGA can be considered as a generalization version of the Multiple-Pass Circular SQ N-FINDR described above except the former works its way up on a sequence of growing simplexes as number of passes is increased until it reaches p-vertex simplex compared to the latter which always works on p-vertex simplexes for each pass. Consequently, a (p–j)-Pass Causal SGA requires (p–j) passes to complete its task in searching for p endmembers, while the number of passes required for a Multiple-Pass Causal Circular N-FINDR to run is determined by when final sets of endmembers produced by two consecutive runs are identical. Nonetheless, based on our experience there are no more than three passes for a Multiple-Pass Causal Circular N-FINDR to accomplish what it is designed for finding p endmembers.

2. The initial condition used by (p–j)-pass SGA is any simplex with j vertices. Since how well SGA works as an EEA is heavily determined by how good a j-vertex simplex is chosen as its initial condition, judiciously selecting an initial condition is very crucial for SGA to succeed. This can be resolved by soliciting the endmember initialization algorithm (EIA) provided herein.

3. In order to mitigate the problem of finding an appropriate j-vertex simplex as an initial condition for the (p–j)-pass SGA an alternative approach is always to start with a small value of j such as 0, 1 or 2. That is, the smaller the j is, the fewer the number of initial endmembers used by the SGA, the less dependency the SGA on the initial condition, in which case SGA will require more passes to find more endmembers at the expense of more computing time. For example, in order to find first two endmembers, $e_1$, $e_2$ which are the two data samples with the maximum distance. A causal processing can be designed as follows.

a) Let $e_1^{(0)} = r_1^{(0)}$ and $e_2^{(0)} = e_2^{(0)}$.

b) For $i \geqq 3$ compute $d(e_1^{(0)}, r_i)$ and $d(e_2^{(0)}, r_i)$ and find the pair, denoted by $(e_1^{(i-2)}, e_2^{(i-2)})$ that produces the largest distance among $d(e_1^{(i-3)}, r_i^{(i-3)})$, $d(e_2^{(i-3)}, r_i^{(i-3)})$ and $d(e_1^{(i-3)}, e_2^{(i-3)})$. If $i<N$, set $i=i+1$ and go to step a). Otherwise, let $e_1^{(N)} \leftarrow e_1$, $e_2^{(N)} \leftarrow e_2$. In this case, there are $$\binom{N}{2} = \frac{N(N-1)}{2}$$

comparisons.

4. Apparently, for (p–j)-pass SGA with $j<N/2$, increasing number of initial endmembers by one also increases its computing time exponentially, e.g., from $$\binom{N}{j} = \frac{N!}{j!(N-J))} \text{ to } \binom{N}{j+1} = \frac{N!}{(j+1)(N-j-1))}.$$

Therefore, according to our experience, the best compromise between computational time and the number of initial endmembers is j=0.

Figure 5A:
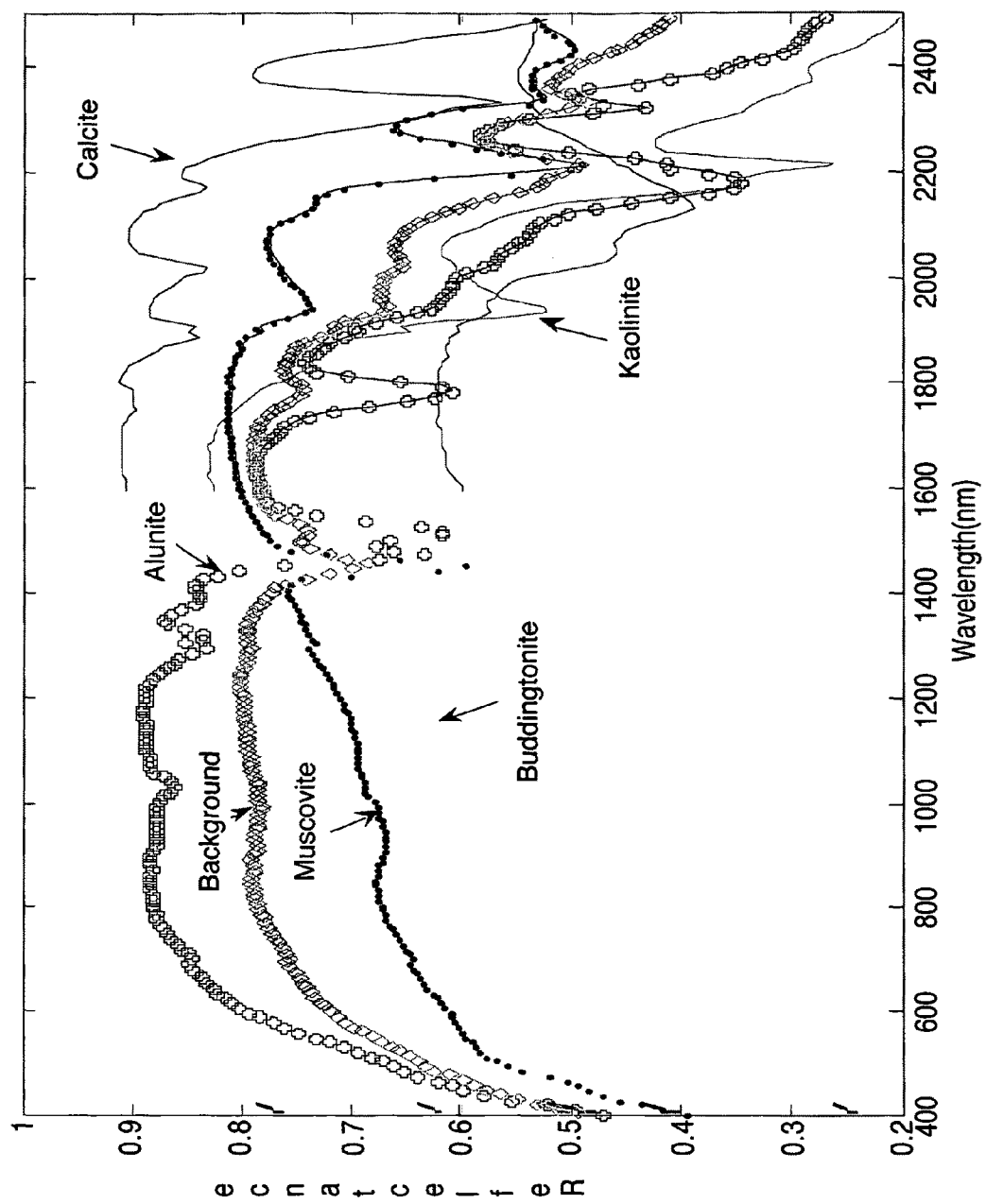
FIG. 5A-5D depict the spectra of five pure pixels plus a background signature obtained by equally mixing all the five mineral spectra (FIG. 5A) and a cuprite AVIRIS image scene 9 with spatial positions of five pure pixels (FIG. 5B) corresponding to minerals: alunite (A), buddingtonite (B), calcite (C), kaolinite (K) and muscovite (M) provided by the USGS and five reflectance (FIG. 5C) and radiance (FIG. 5D) USGS ground-truth mineral spectra.

Assume that $c_j$ is the cost of calculating the volume of a j-vertex simplex. Then the computational complexity of maximum volume-based EEAs, based on number of times to calculate various simplexes required by algorithms, is tabulated in Table 1 set is the reflectance laboratory data which is available on the USGS website. Five mineral spectra with 224 bands, Alunite (A), Buddingtonite (B), Calcite (C), Kaolinite (K) and Muscovite (M) are shown in FIG. 5A.

Figure 5B:
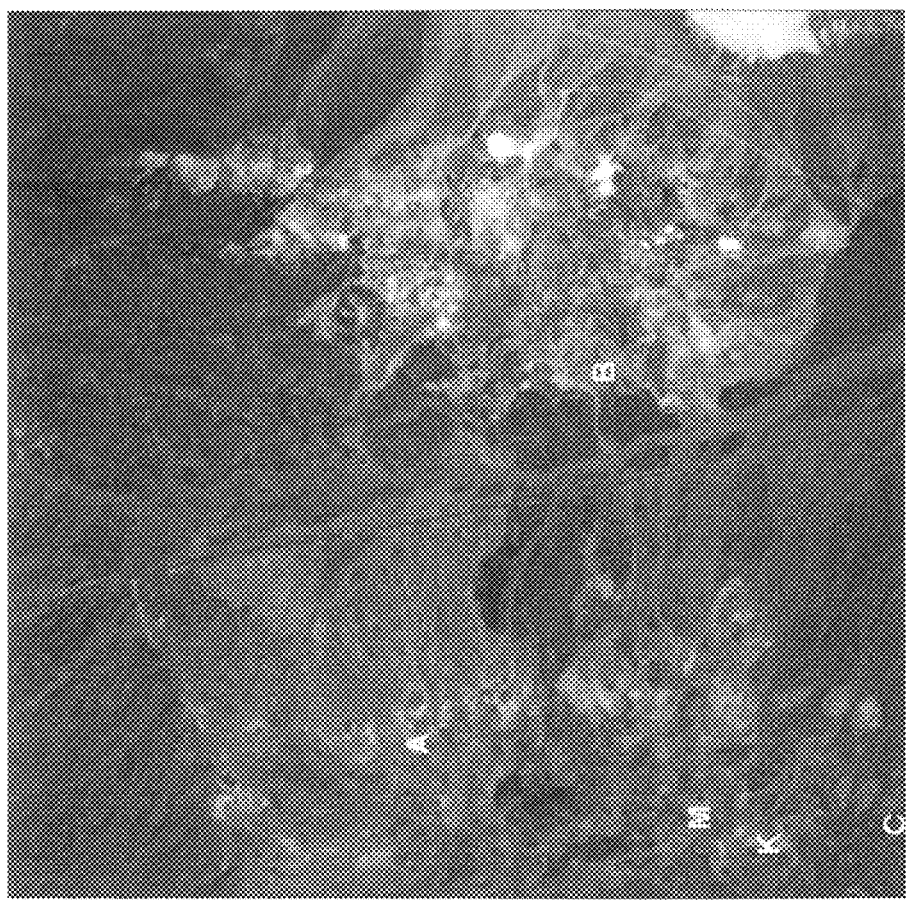

Two other data sets are obtained from the real AVIRIS Cuprite image data shown in FIG. 5B which is also available on the USGS website. The scene is a 224-band image with size of 350×350 pixels and was collected over the Cuprite mining site, Nevada, in 1997. It is well understood mineralogically. As a result, a total of 189 bands were used for experiments where bands 1-3, 105-115 and 150-170 have been removed prior to the analysis due to water absorption and low signal to noise ratio (SNR) in those bands. Although there are more than five minerals on the data set, the ground truth available for this region only provides the locations of the pure pixels: Alunite (A), Buddingtonite (B), Calcite (C), Kaolinite (K) and Muscovite (M). The locations of these five pure minerals are labeled by A, B, C, K and M respectively and shown in FIG. 5B. Available from image scene are two sets of spectra, reflectance spectra shown in FIG. 5C and radiance spectra in FIG. 5D. By means of these three data sets five different scenarios can be designed for experiments, each of which presents interesting and quite different results.

Scenario 1: Using the Data from FIG. 1

Figure 6A:
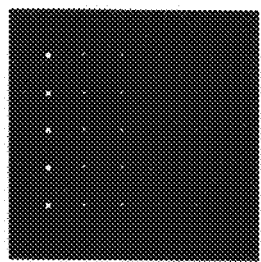
FIGS. 6A-6H depict 25 simulated panels (FIGS. 6A, 6C, 6E, 6G, & 6I) and a synthetic image having the 25 panels simulated therein implanted in the background with an additive Gaussian noise to achieve SNR 20:1 (FIGS. 6B, 6D, 6F, 6H & 6J) used to obtain data in Scenario 1 (FIGS. 6A-6B), Scenario 2 (FIGS. 6C-6D), Scenario 3 (FIGS. 6E-6F), Scenario 4 (b), and Scenario 5 (FIGS. 6G-6H) in Example 1.
Figure 6B:
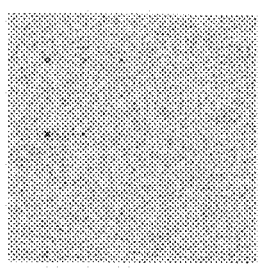

First a synthetic image is generated which has size of 200×200 pixel vectors with 25 panels of various sizes which are arranged in a 5×5 matrix and located at the center of the scene shown in FIGS. 6A-6B. The five mineral spectral signatures, $\{m_i\}_{i=1}^5$ in FIG. 5A were used to simulate these 25 panels where each row of five panels was simulated by the same mineral signature and each column of 5 panels has the same size. Among 25 panels are 5 4×4-pure pixel panels for endmember extraction, $p_{4 \times 4}^i$ for $i=1, \ldots, 5$ in the $1^{st}$ column, 5 2×2-pure pixel panels for training samples, $p_{2 \times 2}^i$ for $e=1, \ldots, 5$ in the $2^{nd}$ column, 5 2×2 mixed pixel panels, $\{p_{3,jk}^i\}_{j=1,k=1}^{2,2}$ for $x=1, \ldots, 5$ in the $3^{rd}$ column for mixed pixel classification, 5 subpixel panels, $p_{4,1}^i$ for $i=1, \ldots, 5$ in the $4^{th}$ column for subpixel classification and 5 sub-pixel panels, $p_{5,1}^i$ for $i=1, \ldots, 5$ in the $5^{th}$ column for subpixel classification. The reason that the 5 panels in the $2^{nd}$ column were included in the image scene was to use them as training samples for supervised classification. The purpose of introducing the 5 panels in the $3^{rd}$ column was designed to conduct a study and analysis on five mineral signatures with different mixing in a pixel. Table 2 tabulates the mixing details of mineral composition in the 20 simulated mixed panels in the $3^{rd}$ column.

TABLE 1

| N-FINDR | Causal IN-FINDR | Causal SQ N-FINDR | Causal Circular N-FINDR | ρ-pass Causal SC N-FINDR | (ρ – j)–pass Causal SGA |
|---|---|---|---|---|---|
| $\frac{N!}{(N-p)!p!} \cdot c_p$ | $c_p \cdot p \cdot (N-p) \cdot K$ | $c_p \cdot p \cdot (N-p)$ | $c_p \cdot p \cdot (N-p)$ | $c_p \cdot p \cdot (N-p)$ | $(p-j) \cdot (N-j) \cdot \left(\sum_{i=j}^{p} c_i\right)$ |

The following examples are given for the purpose of illustrating various embodiments of the invention and are not meant to limit the present invention in any fashion.

Example 1

Synthetic Imaging: SGA

Three Airborne Visible/InfraRed Imaging Spectrometer (AVIRIS) Cuprite data sets were used for experiments. One

TABLE 2

| | | |
|---|---|---|
| row 1 | $p_{3,11}^1 = 0.5A + 0.5B$ | $p_{3,12}^1 = 0.5A + 0.5C$ |
| | $p_{3,21}^1 = 0.5A + 0.5K$ | $p_{3,22}^1 = 0.5A + 0.5M$ |
| row 2 | $p_{3,11}^2 = 0.5A + 0.5B$ | $p_{3,12}^2 = 0.5B + 0.5C$ |
| | $p_{3,21}^2 = 0.5B + 0.5K$ | $p_{3,22}^2 = 0.5B + 0.5M$ |
| row 3 | $p_{3,11}^3 = 0.5A + 0.5C$ | $p_{3,12}^3 = 0.5B + 0.5C$ |
| | $p_{3,21}^3 = 0.5C + 0.5K$ | $p_{3,22}^3 = 0.5C + 0.5M$ |

TABLE 2-continued

| row 4 | $p_{3.11}^4 = 0.5A + 0.5K$ | $p_{3.12}^4 = 0.5B + 0.5K$ |
| | $p_{3.21}^4 = 0.5C + 0.5K$ | $p_{3.22}^4 = 0.5K + 0.5M$ |
| row 5 | $p_{3.11}^5 = 0.5A + 0.5M$ | $p_{3.12}^5 = 0.5B + 0.5M$ |
| | $p_{3.21}^5 = 0.5C + 0.5M$ | $p_{3.22}^5 = 0.5K + 0.5M$ |

The inclusion of the panels in the $4^{th}$ and $5^{th}$ columns is to investigate subpixel effects on endmember extraction and their simulated abundance fractions are tabulated in Table 3 where the background (BKG) was simulated by mixing 20% of each of five mineral signatures, A, B, C, K and M, i.e., 20% A+20% B+20% C+20% K+20% M. So, there are 100 pure pixels, 20 mixed pixels and 10 subpixels, all of which were simulated by 5 distinct pure mineral signatures. These 25 panels in FIG. 6A-6B were then implanted in the image background in a way that the background pixels were replaced with the implanted panel pixels where the image background was specified by mixing 20% of each of five mineral signatures, A, B, C, K, M, i.e., the average of the five signatures, 20% A+20% B+20% C+20% K+20% M.

TABLE 3

| row | $4^{th}$ column | $5^{th}$ column |
|---|---|---|
| row 1 | $p_{4.11}^1 = 0.5A + 0.5BKG$ | $p_{5.11}^1 = 0.25A + 0.75BKG$ |
| row 2 | $p_{4.11}^2 = 0.5B + 0.5BKG$ | $p_{5.11}^2 = 0.25B + 0.75BKG$ |
| row 3 | $p_{4.11}^3 = 0.5C + 0.5BKG$ | $p_{5.11}^3 = 0.25C + 0.75BKG$ |
| row 4 | $p_{4.11}^4 = 0.5K + 0.5BKG$ | $p_{5.11}^4 = 0.25K + 0.75BKG$ |
| row 5 | $p_{4.11}^5 = 0.5M + 0.5BKG$ | $p_{5.11}^5 = 0.25M + 0.75BKG$ |

Scenario 2: Using the Data in FIG. 3

Figure 5C:
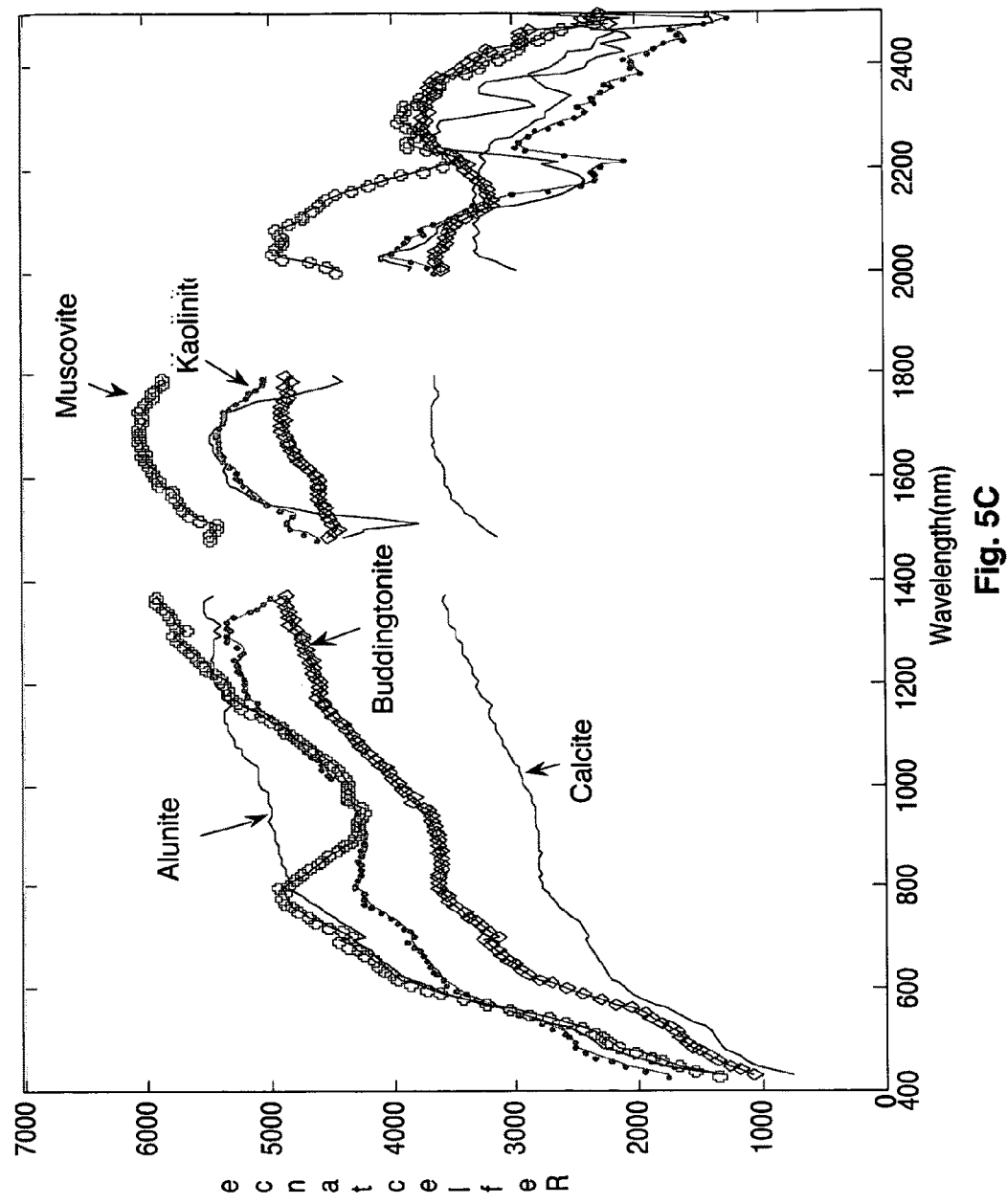
Figure 5D:
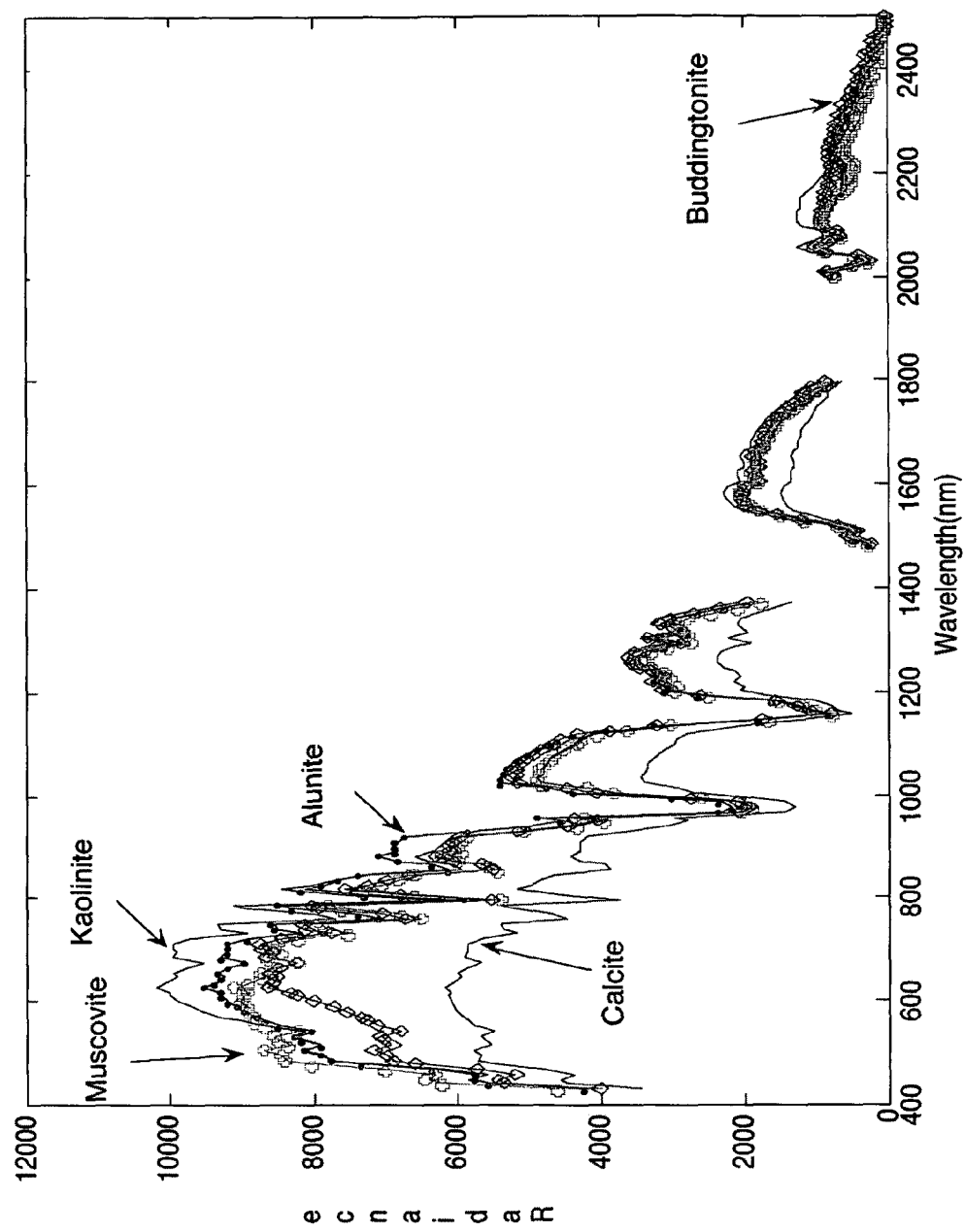
Figure 6C:
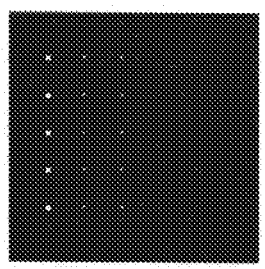
Figure 6D:
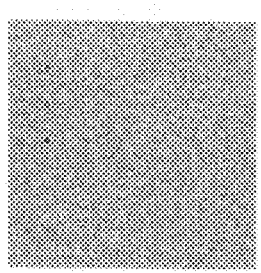

This scenario is exactly the same as Scenario 1 except that the reflectance laboratory data in FIG. 5A used to simulate the synthetic image in FIG. 5D was replaced with the reflectance spectra of the real image in FIG. 5C. The resulting images are shown in FIG. 6C-6D.

Scenario 3: Using the Data in FIGS. 2 and 3

Figure 6E:
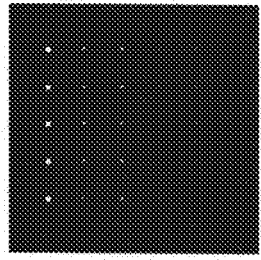
Figure 6F:
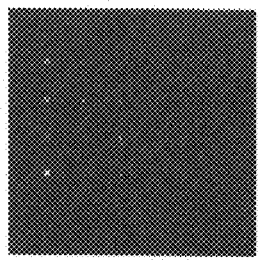
Figure 7A:
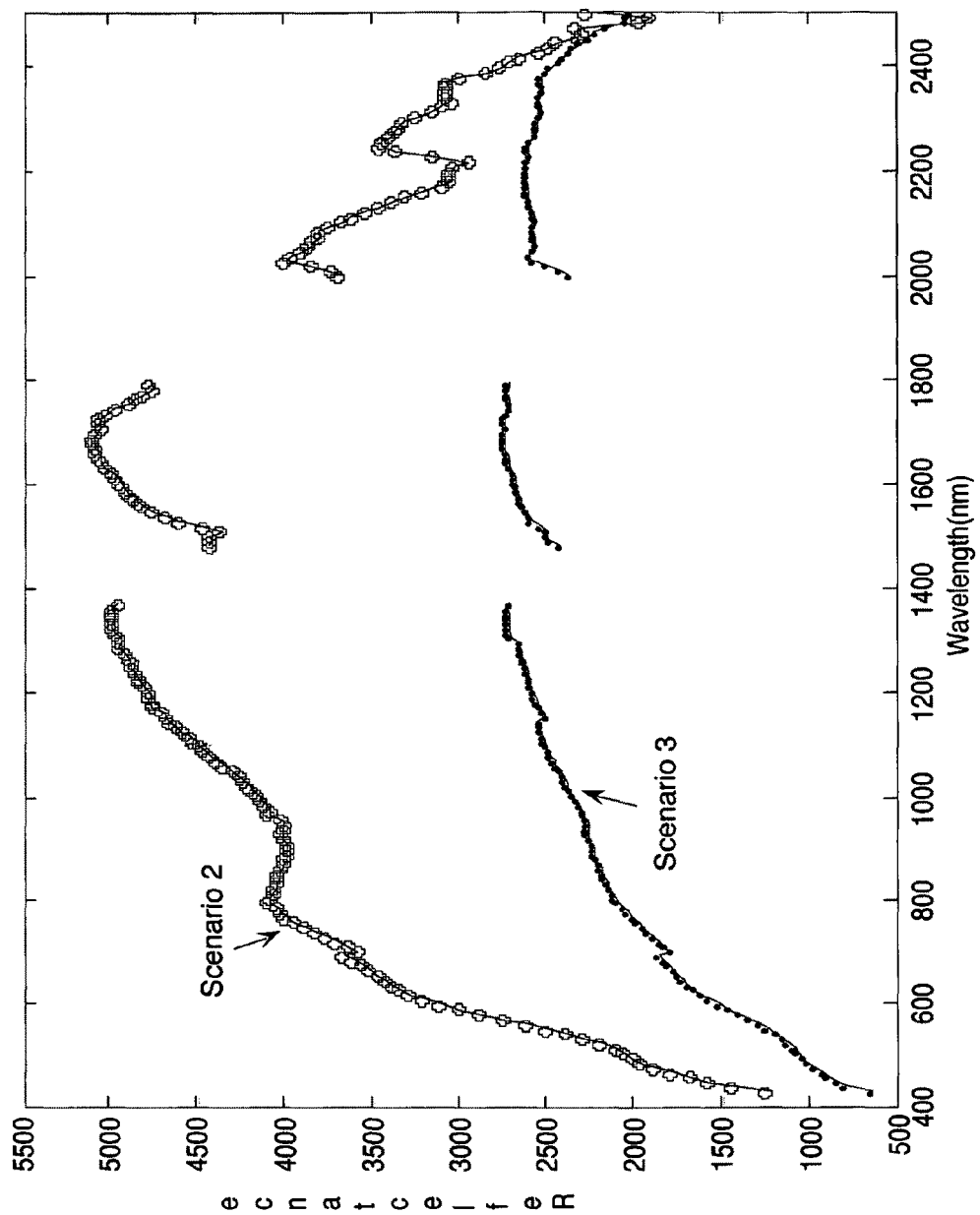
FIGS. 7A-7B depict reflectance spectra of two background signatures used in Scenarios 2 and 3 (FIG. 7A) and in Scenarios 4 and 5 (FIG. 7B)

This scenario is more interesting than Scenarios 1 and 2 in the sense that the background signature was not simulated by equally mixing the five mineral signatures. Instead, the background signature was simulated by the sample mean of the entire real image in FIG. 5C, while all the implanted 25 panels were exactly the same as those simulated in Scenario 2. The images resulting from Scenario 3 are shown in FIG. 6E-6F. FIG. 7A also shows a comparison between the spectral signatures of the two background signatures used in Scenarios 2 and 3.

Scenario 4: Using the Data in FIG. 4

Figure 6G:
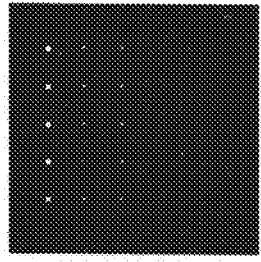
Figure 6H:
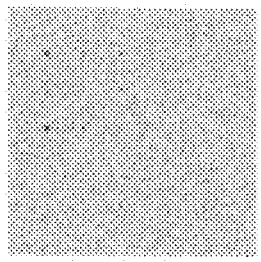

This scenario is exactly the same as Scenario 2 except that the reflectance data in FIG. 5C used to simulate the synthetic image in FIG. 6C-6D was replaced with the radiance spectra of the real image in FIG. 5D. The resulting images are shown in FIG. 6G-6H.

Scenario 5: Using the Data in FIGS. 4 and 3

Figure 6I:
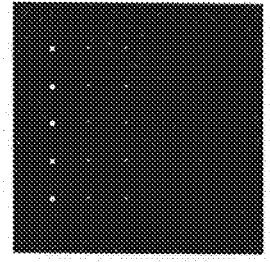
Figure 6J:
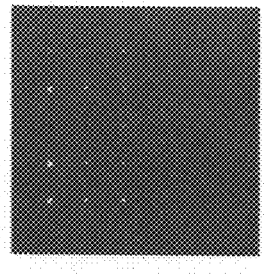
Figure 7B:
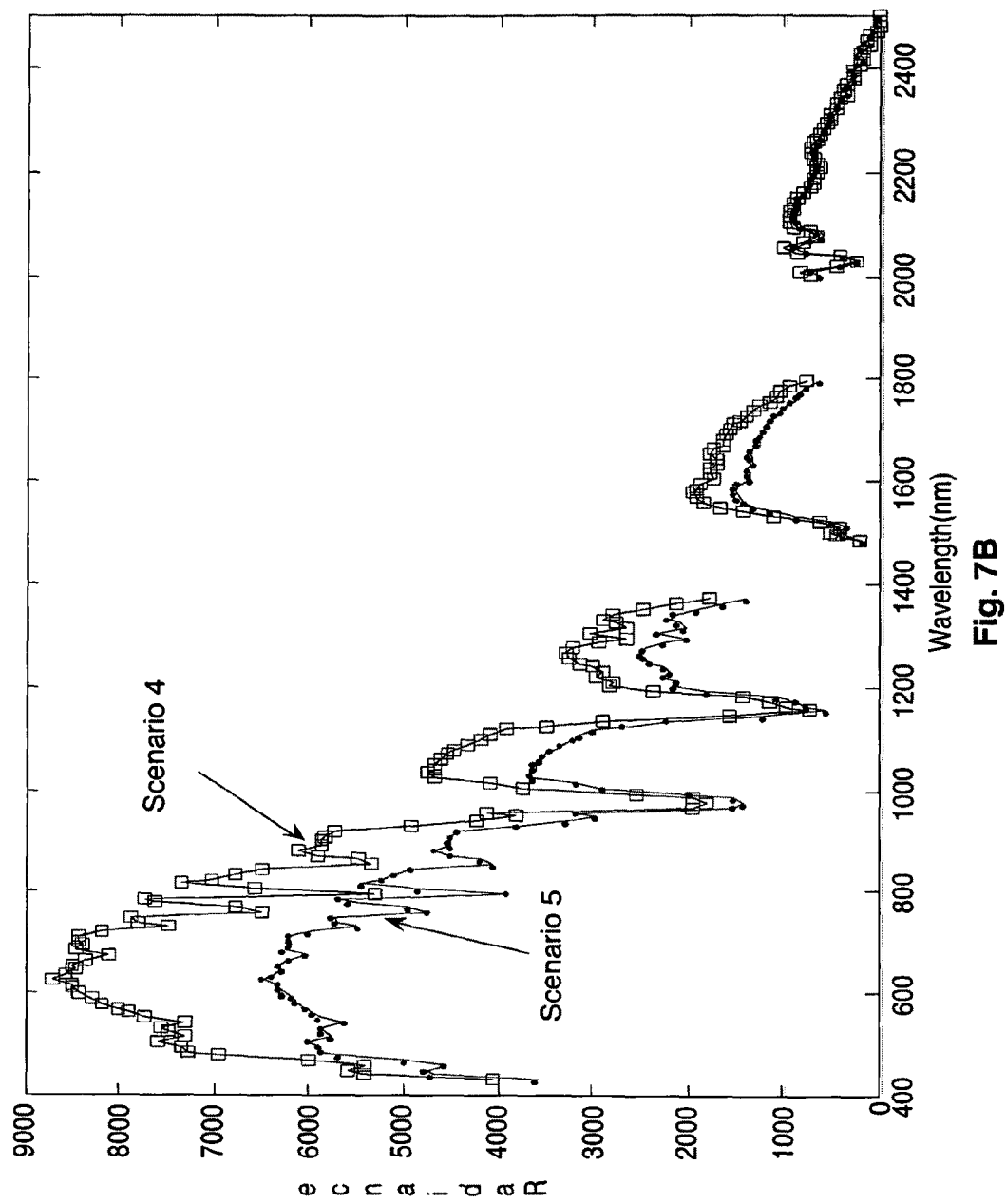
Figure 8B:
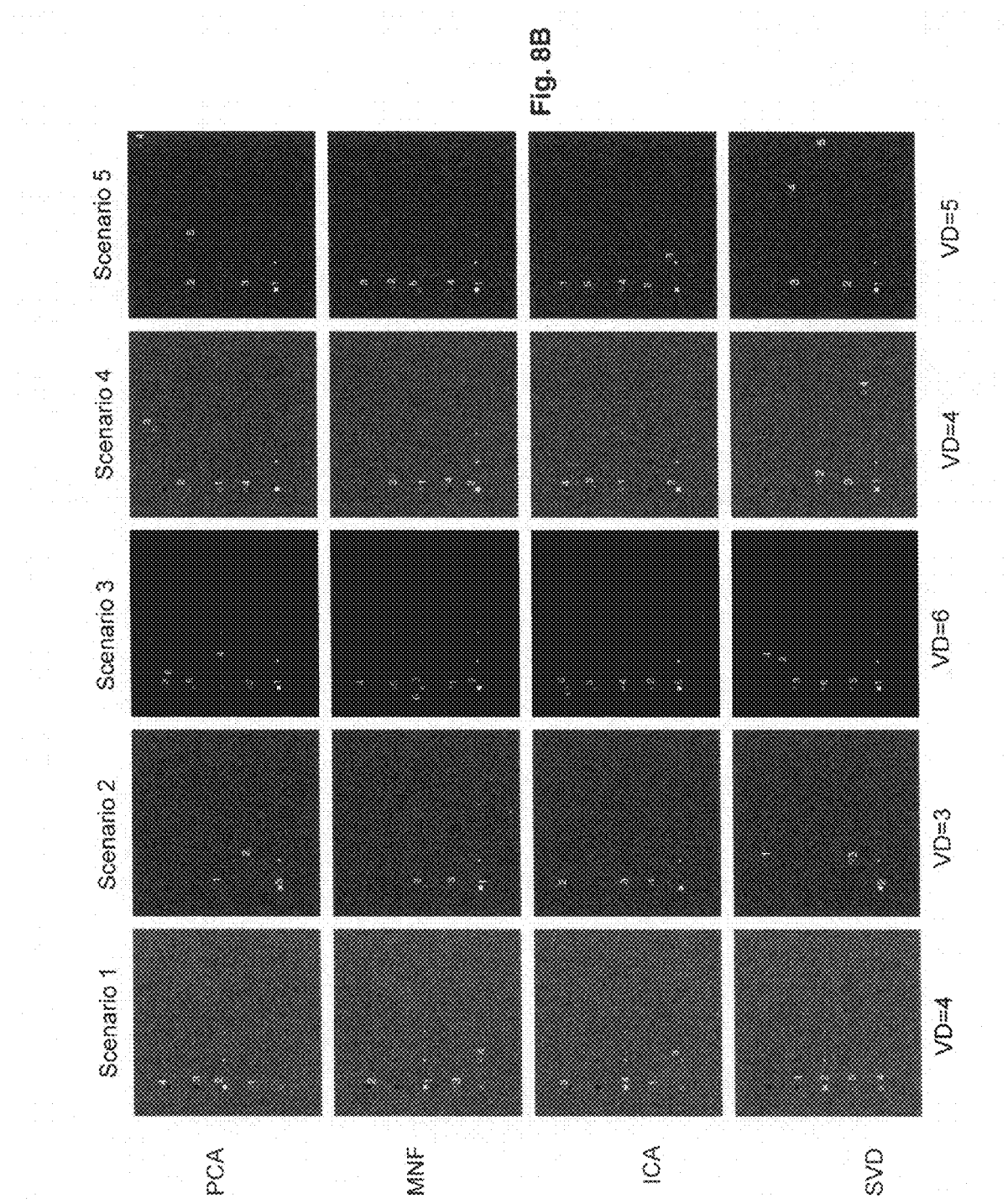
Figure 8D:
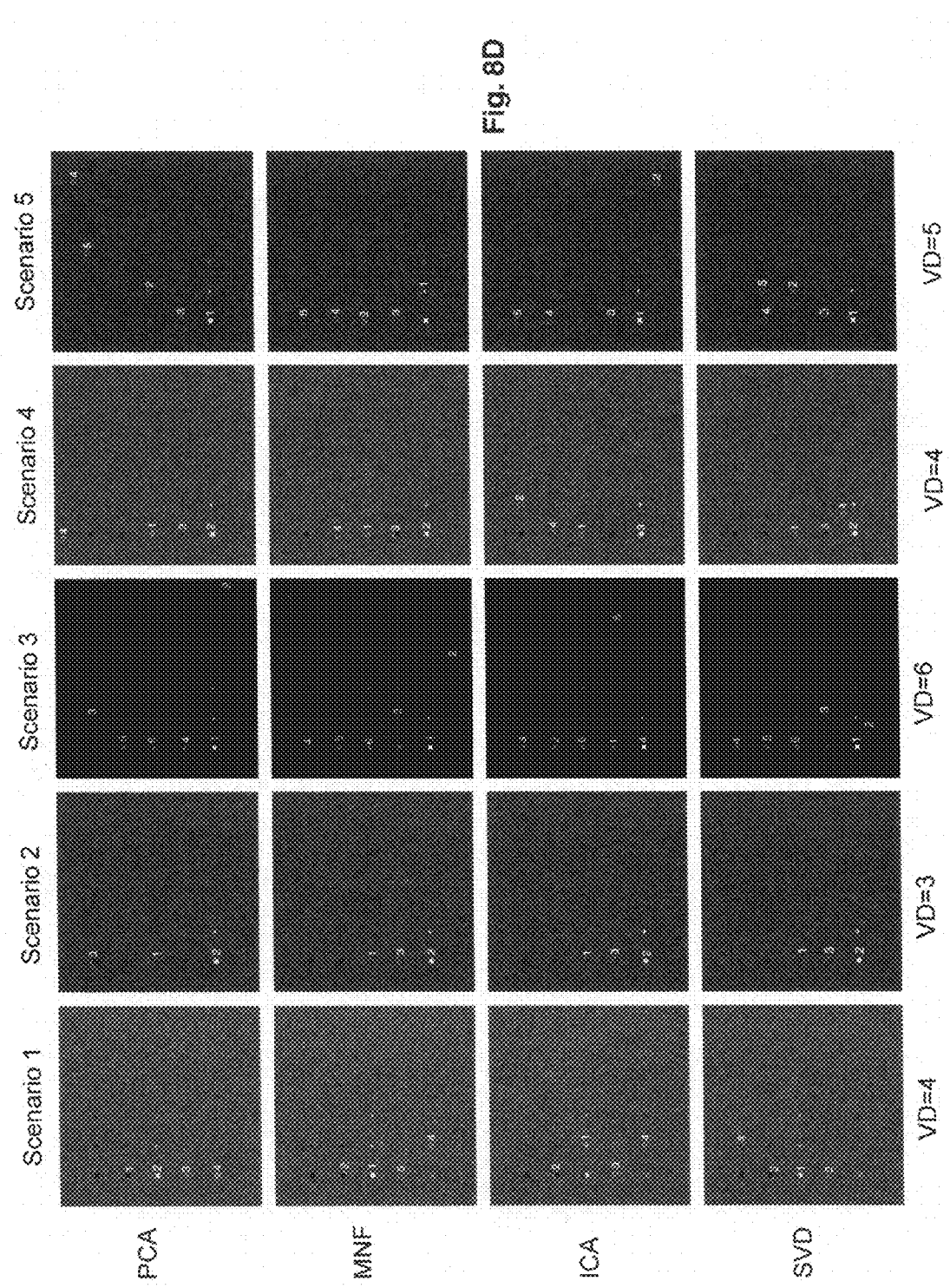

This scenario is also exactly the same as Scenario 3 with the reflectance data in FIG. 5C replaced with the radiance spectra in FIG. 5D. The images resulting from Scenario 5 are shown in FIG. 6I-6J. FIG. 7B also shows a comparison between the spectral signatures of the two background signatures used in Scenarios 4 and 5. Table 4 tabulates different values of p estimated by the VD with various false alarm probabilities, $P_F$ as well as SSE in for the five synthetic images in these five scenarios where the value of p estimated by the VD was consistent for all false alarm probabilities. FIGS. 8A-8B show endmember extraction results by the VCA and SGA respectively using four different dimensionality reduction techniques, PCA, MNF, ICA and SVD for visual assessment where the numbers labeling the pixels in the figures indicated the order that the pixels were extracted by algorithms and the numbers in parentheses are values of the p estimated by either the SSE or the VD.

TABLE 4

| | VD ($P_F = 10^{-1}$) | VD ($P_F = 10^{-2}$) | VD ($P_F = 10^{-3}$) | VD ($P_F = 10^{-4}$) | SSE |
|---|---|---|---|---|---|
| Scenario 1 Lab data (signature mean) | 4 | 4 | 4 | 4 | 3 |
| Scenario 2 Reflectance (signature mean) | 3 | 3 | 3 | 3 | 2 |
| Scenario 3 Reflectance (sample mean) | 6 | 6 | 6 | 6 | 5 |
| Scenario 4 Radiance (signature mean) | 5 | 4 | 4 | 4 | 1 |
| Scenario 5 Radiance (sample mean) | 5 | 5 | 5 | 5 | 2 |

Results

The best among five scenarios was Scenario 3 for which both the SGA and VCA produced their best results, while both criteria also worked at their best in estimating the values of the p. The VD always produced better estimates than did the SSE regardless of which scenario was used. Interestingly, the five scenarios produced different values of the p. This implies that the determination of the p is heavily dependent on the data to be processed.

Also, these scenarios demonstrated that estimation of the p by the VD and SSE for scenarios using sample means as background was better than those using signature means because the sample mean was a mixture of all signatures in the entire image which is generally more spectrally distinct from the five mineral signatures than the signature means which contains 20% of each of five mineral signatures. Therefore, the sample mean represented a spectral class corresponding to the background, and thus may be considered as an endmember even it may nit be a pure signature. This explains why the background signature was extracted as an endmember in many cases in Scenarios 3 and 5. Therefore, the simulated synthetic scene should have 6 endmembers, five of which represent five distinct mineral signatures and one endmember which can be considered as the best among all the five scenarios since the value of the p was estimated to be 6 by the VD and 5 by the SSE.

It should be noted that Scenario 3 was only the case that the value of the p estimated by SSE was correct. However, in this particular scenario there was no way to extract all the five minerals by either SGA or VCA using p=5 because the last extracted mineral signature was always the sixth signature to be extracted. In other words, a background pixel was always among the first five pixels extracted by the SGA and VCA. This indicated that the background must be considered and included as one endmember. So, when the VD estimated the value of the p to be 6, all the five distinct mineral signatures were successfully extracted by the SGA and VCA.

When reflectance data are used (Scenarios 1-3), the values estimated by the SSE are always one less than that estimated by the VD. However, for radiance data used in Scenarios 4-5 the SSE seemed not to work at all, while the VD still worked well. This implies that the VD is a much more reliable technique in estimating the value of p than the SSE when data to be processed are real.

For any estimated value of the p, the SGA performed at least as well as the VCA did. As a matter of fact, on many occasions the SGA actually outperformed the VCA. The VCA could not perform as well as the SGA did because it uses a random vector as an initial endmember every time it generates a new endmember. In order to improve its performance, the VCA needs more than p vertices to find a desired set of endmembers. If the VCA uses twice the value of the p as the number of vertices it needs to generate, all the desired p endmembers would be among the 2p vertices. However, in this case, not all the vertices extracted by the VCA are the endmembers. This same drawback is also found in the PPI which requires as many random vectors, referred to as skewers, as possible to cover all potential directions on which endmembers may be projected.

Thus, the best dimensionality reduction technique was the ICA among PCA, MNF, ICA and SVD, while the SVD seemed to the worst in most of cases. It should be noted that the VCA used in this paper was provided by one of the authors (5) who actually used the SVD in their VCA. The experiments suggest that the VCA using the ICA could certainly improve their original version of the VCA because 1) in many cases endmembers can be considered as anomalies which can be only captured by high order of statistics not $2^{nd}$ order of statistics such as variance, signal to noise ratio; 2) the presence of endmembers has low probability which cannot be described by $2^{nd}$ order of statistics; and 3) when endmembers appear, their sample pools are generally small. As a result, the statistics constituted by endmembers can only contribute very little to $2^{nd}$ order of statistics.

The best performance among all the five scenarios was always the one which implemented the SGA in conjunction with the ICA and where the value of the p was estimated by the VD. It is contemplated that these synthetic image studies provide very useful guidelines and reference for real image experiments such as, but not limited to, which method can estimate the value of the p more reliably and accurately, which algorithm is more appropriate for endmember extraction and which dimensionality reduction technique is more effective in preserving information of endmembers.

Example 2

Synthetic Imaging: Causal IN-FINDR, SQ-FINDR, SC N-FINDR & SGA

Simulation data is used with six scenarios for the real time implementation of IN-FINDR, SQ N-FINDR, SC N-FINDR, and SGA. Due to the complete knowledge of the simulation data, six endmembers were extracted on each scenario by the real time implementation of these algorithms and their performances are evaluated by the number of extracted panels. In the previous implementations of these algorithms, a data dimensionality reduction technique is required as a preprocessing step to reduce the computational complexity and to calculate the determinant of a matrix for simplex volume. However, it is necessary to run on the original image to implement these algorithms in a real time manner since most data dimensionality reduction techniques require the knowledge of the whole data set which is not a causal processing. Running on the original image demands calculations of determinant of a non-square matrix for simplex volume. The Singular Value Decomposition (SVD) is then applied to solve this problem.

Scenario 1

FIGS. 9A-9D show the progress of the first pass when the SQ N-FINDR was implemented in the real time manner. According to the FIG. 9D, which is the result of the first pass, four panels were extracted. Although not shown all panels can be extracted in the second pass and since the result of the third pass is equivalent to the one of the second pass, the SQ N-FINDR stops at the third pass with all of panels extracted. FIG. 10 shows the result of three outer loops executed by the Causal IN N-FINDR. of the p-pass SC N-FINDR where the triangle marks the newly found endmember at that pass. FIG. 11 shows the progress of the first pass when implementing Causal Circular N-FINDR.

Figure 12A:
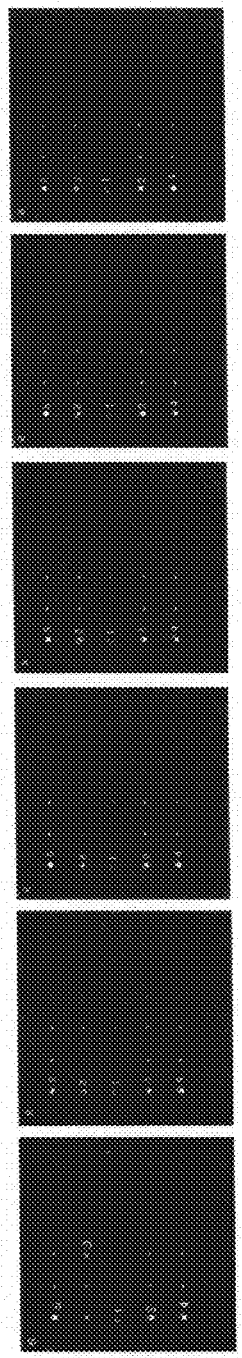
FIG. 12A-12C depict the final results of each pass of 6-pass Causal Circular SC N-FINDR (FIG. 12A), Causal SC N-FINDR (FIG. 12B) and Causal SGA (FIG. 12C).
Figure 12B:
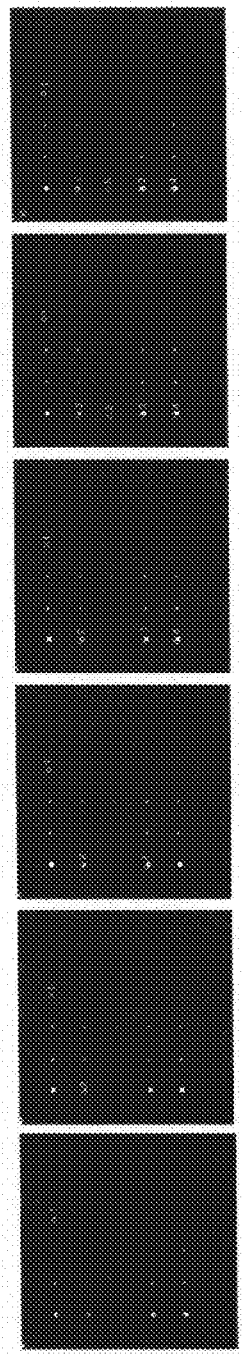
Figure 12C:
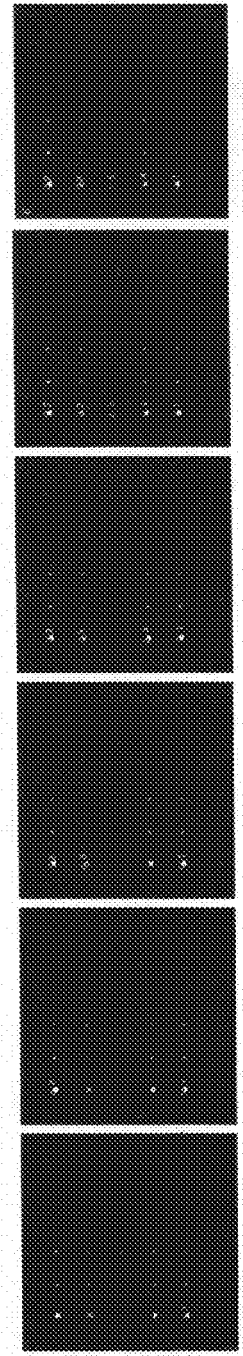
Figure 14A:
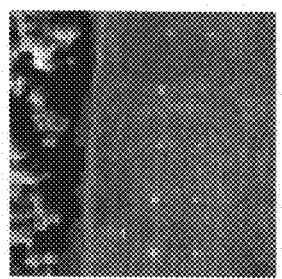
FIGS. 14A-14I depict the results of each pass of the real time p-pass SC N-FINDR
Figure 14B:
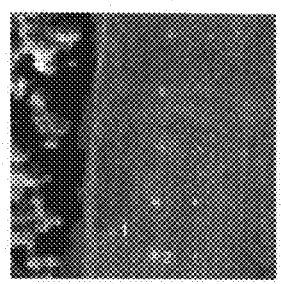
Figure 14C:
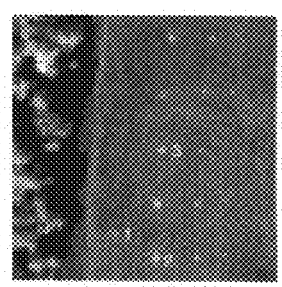
Figure 14D:
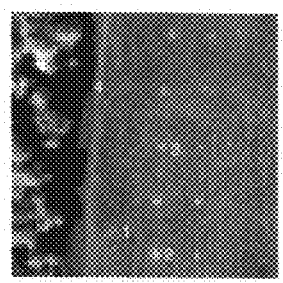
Figure 14E:
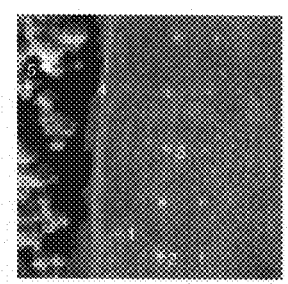
Figure 14F:
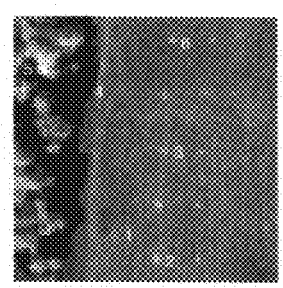
Figure 14G:
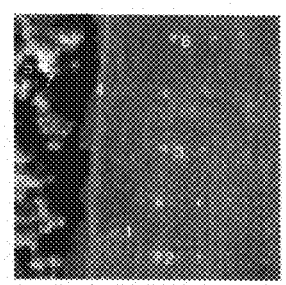
Figure 14H:
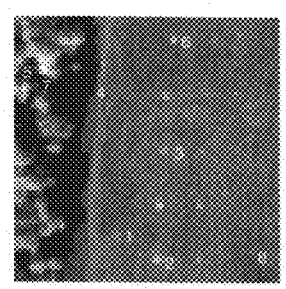
Figure 14I:
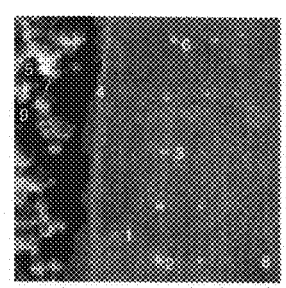
Figure 15A:
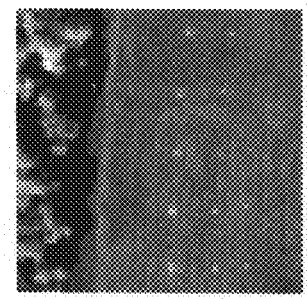
FIGS. 15A-15H depict the results of each pass of the real time (p−1)-pass SGA.
Figure 15B:
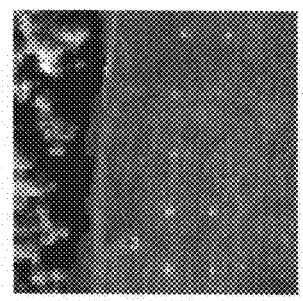
Figure 15C:
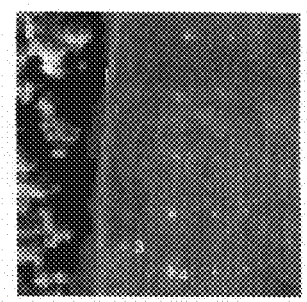
Figure 15D:
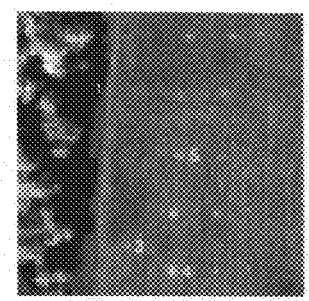
Figure 15E:
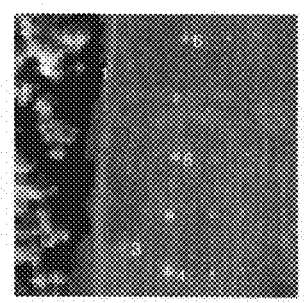
Figure 15F:
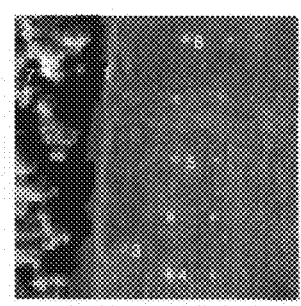
Figure 15G:
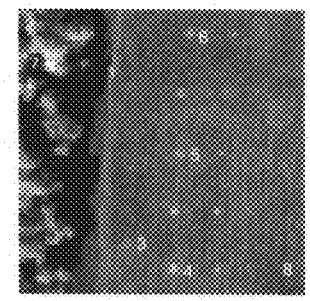
Figure 15H:
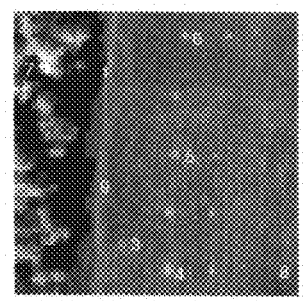
Figure 16A:
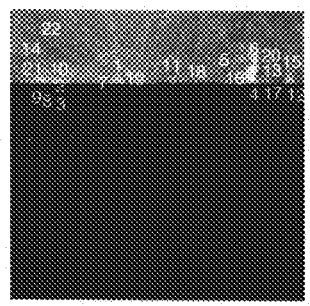
FIGS. 16A-16K depict the progress of the first iteration of the real time SQ N-FINDR (FIGS. 16A-16D) and the results of the following iterations (FIGS. 16E-16K).
Figure 16B:
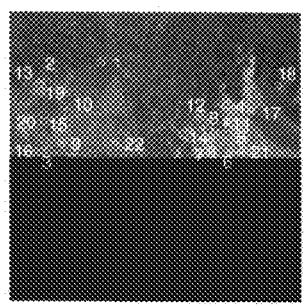
Figure 16C:
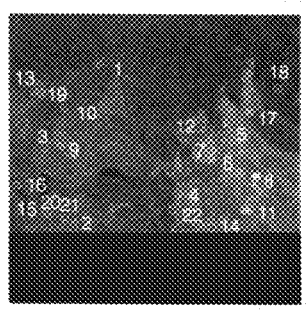
Figure 16D:
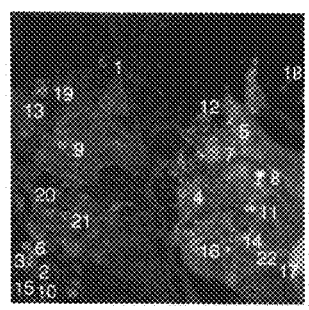
Figure 16E:
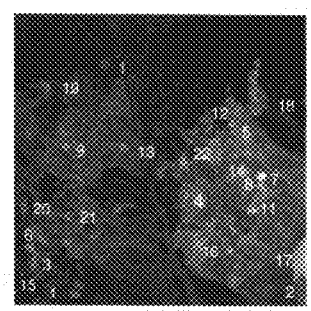
Figure 16F:
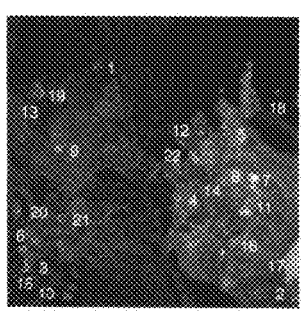
Figure 16G:
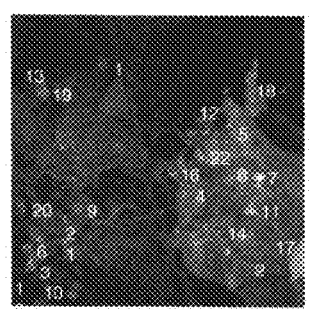
Figure 16H:
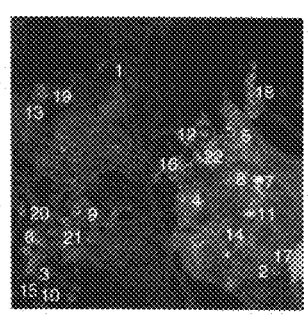
Figure 16I:
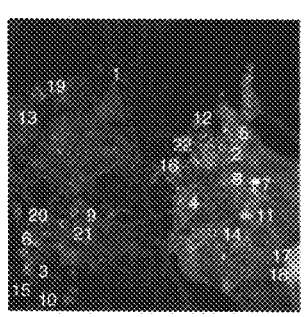
Figure 16J:
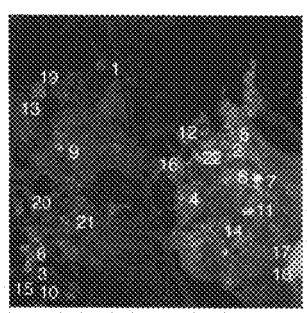
Figure 16K:
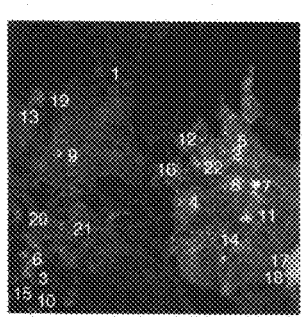

FIGS. 12A-12C show the result of each pass of the Circular SC N-FINDR, the Causal SC N-FINDR and the (p−1)-pass Causal SGA, respectively. The p-pass SC N-FINDR was implemented with the first p pixels as the initial endmembers and each pass replaces one endmember with the pixel which can generate the maximum simplex volume with others. p-pass SC N-FINDR cannot extract the pure pixel of the first panel, which is the case when the SQ N-FINDR was implemented with only single pass. Unlike the SC N-FINDR, the Causal SGA can extract five panels. Table 5 tabulates the computing time of these three algorithms where the computing time of the SC N-FINDR is the best and the IN N-FINDR is about three times slower than the SC N-FINDR.

TABLE 5

| Algorithms | Computing Time (seconds) |
| --- | --- |
| Causal SQ N-FINDR | 43.86 |
| Causal IN N-FINDR | 134.59 |
| Causal Circular N-FINDR | 10.84 |
| p-pass Causal Circular N-FINDR | 50.05 |
| p-pass Causal SC N-FINDR | 42.38 |
| p-pass Causal SGA | 30.42 |

Scenario 2

The same real time algorithms as in Scenario 1 are used where five panels can all be extracted in their final results. It should be noted that the SQ N-FINDR extracted five panels at the first pass and that the following passes only move some panel pixels from the first column to the second column and change the background pixel until the results are stable. The computing time of these results is tabulated in Table 6. The SQ N-FINDR takes more time to finish but the other two computing times are very close to the Scenario 1.

TABLE 6

| | Computing Time (seconds) |
| --- | --- |
| Causal SQ N-FINDR | 44.48 |
| Causal IN N-FINDR | 180.86 |
| Causal Circular N-FINDR | 10.72 |
| p-pass Causal Circular N-FINDR | 49.72 |
| p-pass Causal SC N-FINDR | 43.91 |
| p-pass Causal SGA | 30.86 |

Scenario 3

The same real time algorithms as in Scenario 1 are used. Like the results in the Scenario 2, five panel pixels can all be extracted in their final results, but the SQ N-FINDR requires at least two passes to extract all panels, which only needs single pass in Scenario 2. The results from Scenarios 1-3 indicated that the real time SQ N-FINDR has better performance in Scenario 2 and 3 because of noise which is also the case for the p-pass SC N-FINDR. The similar computing times as scenario 2 are tabulated in Table 7.

TABLE 7

|  | Computing Time (seconds) |
| --- | --- |
| Causal SQ N-FINDR | 45.09 |
| Causal IN N-FINDR | 180.98 |
| Causal Circular N-FINDR | 10.88 |
| p-pass Causal Circular N-FINDR | 49.08 |
| p-pass Causal SC N-FINDR | 43.23 |
| p-pass Causal SGA | 30.74 |

Scenario 4

The same real time algorithms as in Scenario 1 are used. The final result of the p-pass SC N-FINDR missed the pure pixel of the fifth panel, which is similar to the result in Scenario 1. This result emphasizes the previous conclusion that the SQ N-FINDR and SC N-FINDR have better performance when the data contains noise. The computing time shown in Table 8 indicates that the different scenarios do not have much impact on the computing time of the p-pass SC N-FINDR and (p−1)-pass SGA.

TABLE 8

|  | Computing Time (seconds) |
| --- | --- |
| Causal SQ N-FINDR | 44.26 |
| Causal IN N-FINDR | 133.79 |
| Causal Circular N-FINDR | 10.51 |
| p-pass Causal Circular N-FINDR | 49.02 |
| p-pass Causal SC N-FINDR | 42.18 |
| p-pass Causal SGA | 31.23 |

Scenario 5

The same real time algorithms as in Scenario 1 are used. In this Scenario the SQ N-FINDR can extract five panels and one background pixel at the first pass, but it moved the background pixel to one of the fourth panel pixels at the third pass. Thus in the final result miss the background pixel is missed and the panels contain two fourth panel pixels. This is similar to the results on the SC N-FINDR which has two fifth panel pixels without any background pixel in the final result. Table 9 shows that the SQ N-FINDR takes more computing time in this scenario but the computing time of the p-pass SC N-FINDR and (p−1)-pass SGA is still very close to previous scenarios.

TABLE 9

|  | Computing Time (seconds) |
| --- | --- |
| Causal SQ N-FINDR | 45.73 |
| Causal IN N-FINDR | 226.66 |
| Causal Circular N-FINDR | 10.71 |
| p-pass Causal Circular N-FINDR | 49.38 |
| p-pass Causal SC N-FINDR | 43.44 |
| p-pass Causal SGA | 30.60 |

Scenario 6

The same real time algorithms as in Scenario 1 are used. Like Scenario 3, the final result covers all five panels and one background pixel. Compared with the previous scenario, the SQ N-FINDR only needs about half of the computing time in this scenario. However, the computing times, as shown in Table 10, of the p-pass SC N-FINDR and (p−1)-pass SGA remains similar on the six scenarios.

TABLE 10

|  | Computing Time (seconds) |
| --- | --- |
| Causal SQ N-FINDR | 45.70 |
| Causal IN N-FINDR | 136.24 |
| Causal Circular N-FINDR | 10.73 |
| p-pass Causal Circular N-FINDR | 49.61 |
| p-pass Causal SC N-FINDR | 43.59 |
| p-pass Causal SGA | 31.05 |

Example 3

Real Image Experiments

Real HYDICE and Cuprite data were used to make a performance comparison among these real time implemented N-FINDRs. They were running on the original image without any data dimensionality reduction. 9 endmembers in the HYDICE data and 22 endmembers in the Cuprite, estimated by the VD with $P_F=10^{-4}$, are extracted. Their performance can be compared by the number of extracted panels and materials in the HYDICE and Cuprite data.

HYDICE Data

The results of the real time implementation of N-FINDRs were shown in FIGS. 13A-13G, 14A-14I and 15A-15H. FIGS. 13A-13F show that the SQ N-FINDR can extract three panels at the first pass and the following passes do not improve the performance much. In the case of the p-pass SC N-FINDR (FIGS. 14A-14I) and (p−1)-pass SGA (FIGS. 15A-15H), only six endmembers are required to extract three panels. The computing time tabulated in Table 11 shows that the SQ N-FINDR is still the slowest one but the SGA is a little bit faster than the SC N-FINDR in this data set.

TABLE 11

|  | Computing Time (second) |
| --- | --- |
| SQ N-FINDR | 34.13 |
| SC N-FINDR | 8.72 |
| SGA | 8.46 |

Cuprite Data

Figure 17M:
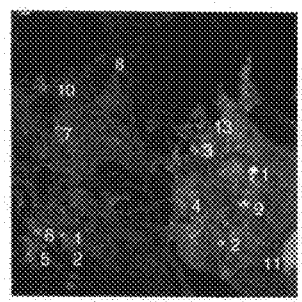
FIGS. 17A-17V depict the results of each of 22 passes of the real time p-pass SC N-FINDR.
Figure 17N:
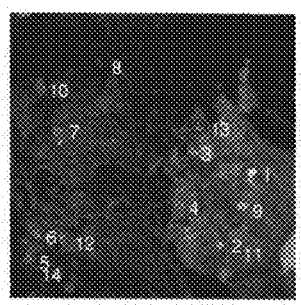
Figure 17O:
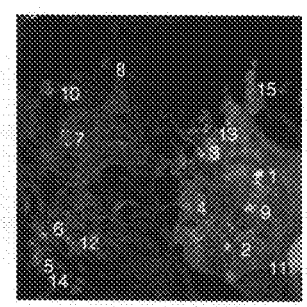
Figure 17P:
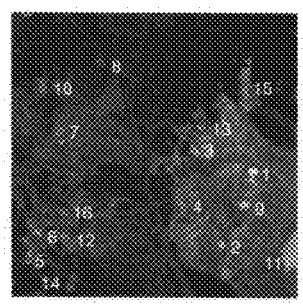
Figure 17Q:
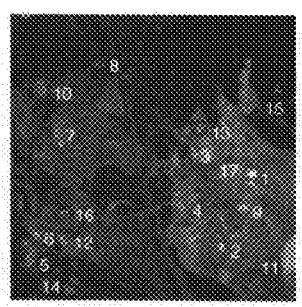
Figure 17R:
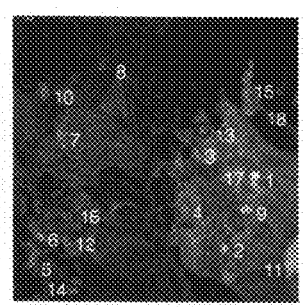
Figure 17S:
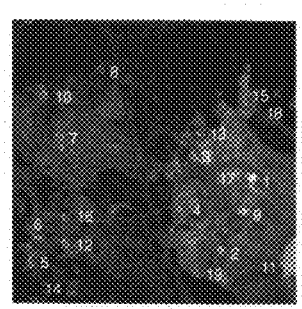
Figure 17T:
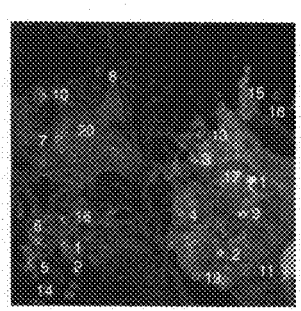
Figure 17U:
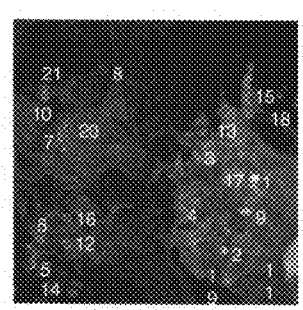
Figure 17V:
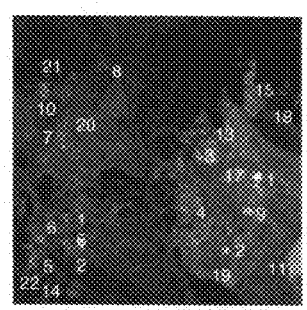
Figure 18A:
FIGS. 18A-18U depict the result of each of 21 passes of the real time (p−1)-pass SGA
Figure 18B:
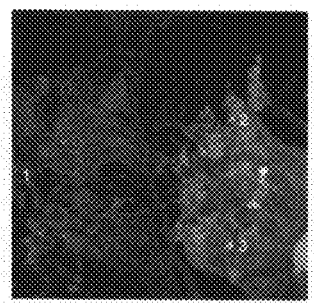
Figure 18C:
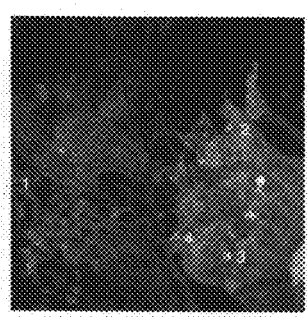
Figure 18D:
Figure 18E:
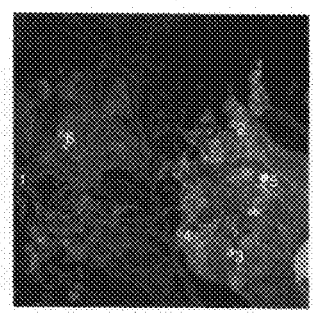
Figure 18F:
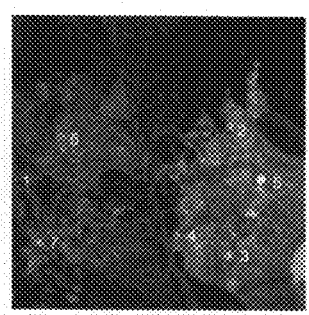
Figure 18G:
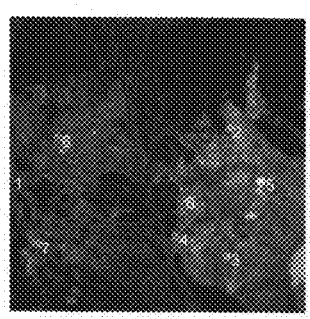
Figure 18H:
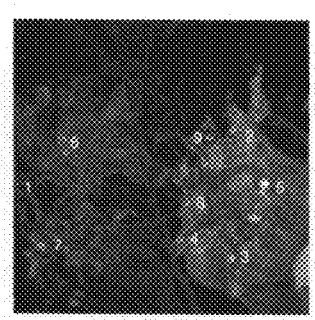
Figure 18I:
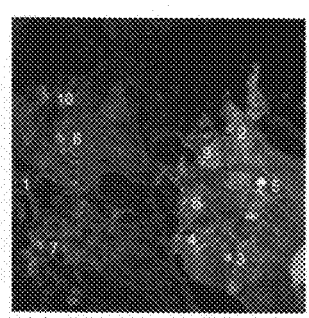
Figure 18J:
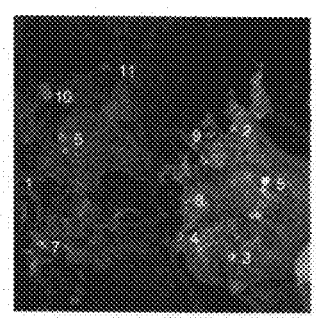
Figure 18K:
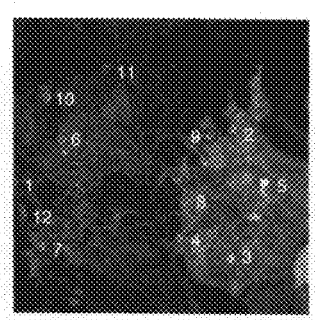
Figure 18L:
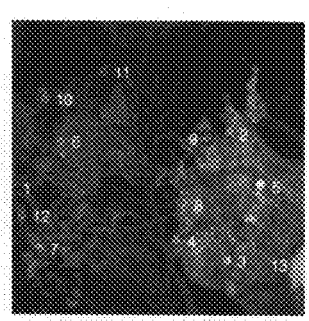

The results of these algorithms on the Cuprite reflectance were shown in FIGS. 16A-16K, 17A-17V, 18A-18U, and 19A-19C where the number of extracted materials in their final results which is indicated by the number under each figure. Table 12 tabulates the computing time of these results where the (p−1)-pass SGA (FIGS. 18A-18U) is much faster in this case. A conclusion can be drawn that the computing time of (p−1)-pass SGA starts to outperform the p-pass SC N-FINDR (FIGS. 17A-17V) when the number of endmembers is increased.

TABLE 12

|  | Computing Time (second) |
| --- | --- |
| SQ N-FINDR | 10086 |
| SC N-FINDR | 1243.6 |
| SGA | 811.01 |

The following references are cited herein.
1. Winter, M. E., Image Spectrometry V, Proc. SPIE 3753: 266-277, 1999.
2. Boardman et al., Mapping Target Signatures Via Partial Unmixing of AVIRIS Data, Summaries of JPL Airborne Earth Science Workshop, 4 Pasadena, Calif., 1995.

Any publications mentioned in this specification are indicative of the levels of those skilled in the art to which the invention pertains. Further, these publications are incorporated by reference herein to the same extent as if each individual publication was specifically and individually incorporated by reference.

One skilled in the art will readily appreciate that the present invention is well adapted to carry out the objects and obtain the ends and advantages mentioned, as well as those inherent therein. The present examples along with the methods, processes, algorithms and computer program products described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A process for extracting one or more endmembers from hyperspectral image data in real time, comprising:
   implementing, in a computer having a memory and a processor, an algorithm that enables processor-executable instructions for applying to the hyperspectral image data steps comprising:
   estimating a p number of endmembers to be generated;
   selecting one or more initial endmembers to form a simplex of k vertices;
   adding a k+1 endmember to the simplex that yields a maximum simplex volume until k=p, thereby extracting one or more endmembers from the data.

2. The process of claim 1, wherein values of p are estimated via virtual dimensionality.

3. The process of claim 1, wherein selecting one or more endmembers is causal and implementable in real time.

4. The process of claim 1, wherein adding one or more endmembers at a time is causal and implementable in real time.

5. The process of claim 1, wherein selecting one or more initial endmembers comprises randomly selecting a data sample vector as an initial endmember and setting k=0.

6. The process of claim 1, wherein selecting one or more initial endmembers comprises randomly selecting a pair of two data sample vectors to form a random degenerate 2-dimensional simplex.

7. A process for extracting one or more endmembers from hyperspectral image data in real time, comprising:
   implementing, in a computer having a memory and a processor, an algorithm that enables processor-executable instructions for applying to the hyperspectral image data steps comprising:
   forming an initial simplex set of p endmembers obtained from the hyperspectral image data;
   finding a maximum simplex volume formed by one or more initial p endmembers therewithin;
   replacing one or more of the p endmembers within the simplex with one or more of the found p endmembers of maximum volume; and
   refinding a maximum simplex volume of p endmember(s) and replacing p endmember(s) until no increase in p endmember(s) volume is found, thereby extracting the endmember(s).

8. The process of claim 7, further comprising:
   estimating a p number of endmembers to generate from the data; and
   applying means for reducing data dimensionality to p.

9. The process of claim 8, wherein values of p are estimated via virtual dimensionality.

10. The process of claim 7, wherein the process steps are implemented as outer and inner iterative loops, said outer loop comprising:
    finding the maximum simplex volume of the initial p endmembers; and
    said inner loop comprising:
    replacing the p endmember in the initial set absent from the found maximum simplex volume with the found p endmember to form a new initial simplex for outer loop processing.

11. The process of claim 7, wherein one p endmember is replaced during each iteration of the process.

12. The process of claim 7, wherein two or more p endmembers are replaced simultaneously during each iteration of the process.

13. The process of claim 7, wherein two p endmembers are replaced successively during each iteration of the process.

14. The process of claim 7, wherein the found p endmembers replace the initial set of p endmembers during each iteration of the process.

15. The process of claim 7, wherein the found p endmember(s) of maximum simplex volume replace the initial p endmembers of smallest volume.

16. The process of claim 7, wherein replacing one or more endmembers at a time is causal and implementable in real time.

17. A process for extracting one or more endmembers from hyperspectral image data in real time, comprising:
    implementing, in a computer having a memory and a processor, an algorithm that enables processor-executable instructions for an outer loop process and an inner loop process applied to the hyperspectral image data;
    said outer loop process comprising finding the maximum simplex volume of an initial simplex formed by p endmembers; and
    said inner loop process comprising replacing the p endmember in the initial set absent from the found maximum simplex volume with the found p endmember to form a new initial simplex for outer loop processing until no increase in simplex volume is found, thereby extracting the endmember(s).

18. The process of claim 17, further comprising:
    estimating a p number of endmembers to generate from the data; and
    applying means for reducing data dimensionality to p.

19. The process of claim 18, wherein values of p are estimated via virtual dimensionality.

20. The process of claim 17, wherein replacing one or more endmembers at a time is causal and implementable in real time.

21. A computer program product having a memory that tangibly stores processor-executable instructions for applying an algorithm for extracting endmember(s) from hyperspectral data, said algorithm enabling instructions to:
    estimate a p number of endmembers to be generated;
    select one or more initial endmembers to form a simplex of k vertices;
    add a k+1 endmember to the simplex that yields a maximum simplex volume until k=p, thereby extracting one or more endmembers from the data.

22. The computer program product of claim 21, said algorithm enabling instructions to estimate p via virtual dimensionality.

23. The computer program product of claim 21, said algorithm enabling instructions to randomly select a data sample vector as an initial endmember and to set k=0.

24. The process of claim 21, said algorithm enabling instructions to randomly select a pair of two data sample vectors to form a random degenerate 2-dimensional simplex.

25. The computer program product of claim 21, said algorithm enabling instructions that are causal and implementable in real time.

26. A computer-readable medium tangibly storing the computer program product of claim 21.

27. A computer program product having a memory that tangibly stores processor-executable instructions for applying an algorithm for extracting endmember(s) from hyperspectral data, said algorithm enabling instructions to:

form an initial simplex set of p endmembers obtained from the hyperspectral image data;

find a maximum simplex volume formed by one or more initial p endmembers therewithin;

replace one or more of the p endmembers within the simplex with one or more of the found p endmembers of maximum volume; and refind a maximum volume of p endmember(s) and replace p endmember(s) until no increase in p endmember(s) volume is found.

28. The computer program product of claim 27, said algorithm further enabling instructions to:

assign a p number of endmembers to generate from the data; and apply means for reducing data dimensionality to p.

29. The computer program product of claim 27, wherein said algorithm enables instructions to implement outer and inner iterative loop processes, said outer loop process finding the maximum simplex volume formed by the initial p endmembers; and said inner loop process replacing the p endmember in the initial set absent from the found maximum simplex volume with the found p endmember to form a new initial simplex for the outer loop.

30. The computer program product of claim 27, said algorithm enabling instructions to replace one p endmember during each iteration of the process.

31. The computer program product of claim 27, said algorithm enabling instructions to simultaneously replace two or more p endmembers during each iteration of the process.

32. The computer program product of claim 27, said algorithm enabling instructions to successively replace two p endmembers during each iteration of the process.

33. The computer program product of claim 27, said algorithm enabling instructions to replace the initial set of p endmembers with the found p endmembers during each iteration of the process.

34. The computer program product of claim 27, said algorithm enabling instructions to replace the initial p endmembers of smallest volume with the found p endmember(s) of maximum volume.

35. The computer program product of claim 27, said algorithm enabling instructions that are causal and implementable in real time.

36. A computer-readable medium tangibly storing the computer program product of claim 27.

* * * * *